US012360474B2

(12) United States Patent
Matsumoto et al.

(10) Patent No.: US 12,360,474 B2
(45) Date of Patent: Jul. 15, 2025

(54) IMAGE-FORMING APPARATUS AND METHOD FOR SUPPRESSING GENERATION OF A DENSITY LEVEL DIFFERENCE CAUSED BY RECIPROCITY FAILURE

(71) Applicant: SHARP KABUSHIKI KAISHA, Sakai (JP)

(72) Inventors: Kazutaka Matsumoto, Sakai (JP); Shota Kaneko, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/418,945

(22) Filed: Jan. 22, 2024

(65) Prior Publication Data

US 2024/0255865 A1 Aug. 1, 2024

(30) Foreign Application Priority Data

Jan. 30, 2023 (JP) ................................ 2023-012365
Jan. 30, 2023 (JP) ................................ 2023-012366
Jan. 30, 2023 (JP) ................................ 2023-012367

(51) Int. Cl.
*G03G 15/04* (2006.01)
*G03G 15/00* (2006.01)
*G03G 15/043* (2006.01)

(52) U.S. Cl.
CPC ..... *G03G 15/0435* (2013.01); *G03G 15/5041* (2013.01); *G03G 15/5045* (2013.01); *G03G 15/5058* (2013.01); *G03G 2215/0404* (2013.01)

(58) Field of Classification Search
USPC ........................................................... 399/49
See application file for complete search history.

(56) References Cited

U.S. PATENT DOCUMENTS 6,236,827 B1 5/2001 Hada
2008/0303887 A1* 12/2008 Hilton ..................... B41J 2/471 347/248
2010/0196052 A1 8/2010 Suhara
2013/0208069 A1 8/2013 Zaima et al.
2014/0363183 A1 12/2014 Zaima et al.

FOREIGN PATENT DOCUMENTS

JP H4-149524 A 5/1992
JP 2000-112206 A 4/2000
JP 2007-237400 A 9/2007
JP 2010-176094 A 8/2010
JP 2013-164517 A 8/2013

* cited by examiner

*Primary Examiner* — Quana Grainger
(74) *Attorney, Agent, or Firm* — ScienBiziP, P.C.

(57) ABSTRACT

An image-forming apparatus employing an electrophotographic method that scans a surface of an image carrier with multi-beams emitted from a plurality of light emitting elements based on image data includes a density smoothing processor that performs a density smoothing process to smooth a density level difference of an image subjected to electronic bow correction, a density correction processor that performs density correction on the image subjected to the bow correction by light amount correction of a surface-crossing exposure segment, and a light emitting element driver controller that controls light emission of a plurality of light emitting elements of a light beam emitter based on the image data subjected to the density smoothing process and a control signal subjected to the density correction.

16 Claims, 26 Drawing Sheets

FIG. 15

| LD8-1 PITCH ADJUSTMENT VALUE [μm] | | | | | | | |
|---|---|---|---|---|---|---|---|
| ~7 | ~8 | ~9 | ~10 | ~11 | ~12 | ~13 | ~14 |
| CORRECTION VALUE H | CORRECTION VALUE G | CORRECTION VALUE F | CORRECTION VALUE E | CORRECTION VALUE D | CORRECTION VALUE C | CORRECTION VALUE B | CORRECTION VALUE A |

| FILM LOSS CORRECTION COUNT (SAME AS SPECIFICATION OF PROCESS CORRECTION) | | | CORRECTION COEFFICIENT Cx |
|---|---|---|---|
| 0 | ~ | 1166667 | 1.0 |
| 1166668 | ~ | 2333333 | 1.1 |
| ≀ | ≀ | ≀ | ≀ |
| 22166668 | ~ | 23333333 | 1.9 |
| 23333334 | ~ | MAX | 2.0 |

FIG. 25

| ENVIRONMENTAL AREA | CORRECTION COEFFICIENT ev |
|---|---|
| 1 | 0.6 |
| 2 | 0.7 |
| 3 | 0.8 |
| 4 | 0.9 |
| 5 | 1.0 |
| 6 | 1.1 |
| 7 | 1.2 |
| 8 | 1.3 |
| 9 | 1.4 |
| 10 | 1.5 |

FIG. 26

| AFTER CHANGE | | TEMPERATURE (°C) | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| | | ~6.5 | ~8 | ~9.5 | ~11 | ~12.5 | ~14 | ~15.5 | ~17 | ~18.5 | ~20 | ~21.25 | ~22.5 | ~23.75 | ~25 | ~26 | ~27 | ~28 | ~29 | ~30 | ~31 | ~32 | ~33 | ~34 | ~35 | ~37 | ~39 | ~41 | ~43 | 43.1~ | 43.1~ |
| HUMIDITY % | ~12.5 | 1 | 1 | 1 | 1 | 2 | 3 | 3 | 4 | 4 | 4 | 4 | 4 | 4 | 4 | 4 | 4 | 4 | 4 | 4 | 4 | 4 | 4 | 5 | 5 | 5 | 5 | 5 | 5 | 5 | 5 |
| | ~15 | 1 | 1 | 1 | 2 | 2 | 3 | 4 | 4 | 4 | 4 | 5 | 5 | 5 | 5 | 5 | 5 | 5 | 5 | 5 | 5 | 5 | 5 | 5 | 5 | 5 | 5 | 5 | 6 | 6 | 6 |
| | ~17.5 | 1 | 1 | 1 | 2 | 2 | 3 | 4 | 4 | 4 | 4 | 5 | 5 | 5 | 5 | 5 | 5 | 5 | 5 | 5 | 5 | 5 | 5 | 5 | 5 | 5 | 5 | 5 | 6 | 6 | 6 |
| | ~20 | 1 | 1 | 1 | 2 | 2 | 3 | 4 | 4 | 4 | 4 | 5 | 5 | 5 | 5 | 5 | 5 | 5 | 5 | 5 | 5 | 5 | 5 | 5 | 5 | 5 | 5 | 5 | 6 | 6 | 6 |
| | ~22.5 | 1 | 1 | 2 | 2 | 3 | 3 | 4 | 5 | 5 | 5 | 5 | 5 | 5 | 5 | 5 | 5 | 5 | 6 | 6 | 6 | 6 | 6 | 6 | 6 | 6 | 6 | 6 | 6 | 6 | 6 |
| | ~25 | 1 | 1 | 2 | 2 | 3 | 3 | 4 | 5 | 5 | 5 | 5 | 5 | 5 | 5 | 5 | 5 | 5 | 6 | 6 | 6 | 6 | 6 | 6 | 6 | 6 | 6 | 6 | 6 | 6 | 6 |
| | ~27.5 | 1 | 1 | 2 | 2 | 3 | 3 | 4 | 5 | 5 | 5 | 5 | 5 | 5 | 5 | 5 | 5 | 5 | 6 | 6 | 6 | 6 | 6 | 6 | 6 | 6 | 6 | 6 | 6 | 6 | 6 |
| | ~30 | 1 | 1 | 2 | 2 | 3 | 3 | 4 | 5 | 5 | 5 | 5 | 5 | 5 | 5 | 5 | 5 | 5 | 6 | 6 | 6 | 6 | 6 | 6 | 6 | 6 | 6 | 6 | 6 | 6 | 6 |
| | ~32.5 | 1 | 2 | 2 | 3 | 3 | 4 | 4 | 5 | 5 | 6 | 6 | 6 | 6 | 6 | 6 | 6 | 6 | 6 | 6 | 7 | 7 | 7 | 7 | 7 | 7 | 7 | 7 | 7 | 7 | 7 |
| | ~35 | 1 | 2 | 2 | 3 | 3 | 4 | 4 | 5 | 5 | 6 | 6 | 6 | 6 | 6 | 6 | 6 | 6 | 6 | 6 | 7 | 7 | 7 | 7 | 7 | 7 | 7 | 7 | 7 | 7 | 7 |
| | ~37.5 | 1 | 2 | 2 | 3 | 3 | 4 | 5 | 5 | 5 | 6 | 6 | 6 | 6 | 6 | 6 | 6 | 6 | 6 | 6 | 7 | 7 | 7 | 7 | 7 | 7 | 7 | 7 | 7 | 7 | 7 |
| | ~40 | 1 | 2 | 2 | 3 | 3 | 4 | 5 | 5 | 5 | 6 | 6 | 6 | 6 | 6 | 6 | 6 | 6 | 6 | 6 | 7 | 7 | 7 | 7 | 7 | 7 | 7 | 7 | 7 | 7 | 7 |
| | ~42.5 | 1 | 2 | 3 | 3 | 4 | 4 | 5 | 6 | 6 | 6 | 6 | 6 | 6 | 6 | 6 | 7 | 7 | 7 | 7 | 7 | 7 | 7 | 7 | 7 | 7 | 7 | 8 | 8 | 8 | 8 |
| | ~45 | 1 | 2 | 3 | 3 | 4 | 4 | 5 | 6 | 6 | 6 | 6 | 6 | 6 | 6 | 6 | 7 | 7 | 7 | 7 | 7 | 7 | 7 | 7 | 7 | 7 | 7 | 8 | 8 | 8 | 8 |
| | ~47.5 | 1 | 2 | 3 | 3 | 4 | 4 | 5 | 6 | 6 | 6 | 6 | 6 | 6 | 6 | 6 | 7 | 7 | 7 | 7 | 7 | 7 | 7 | 7 | 7 | 7 | 7 | 8 | 8 | 8 | 8 |
| | ~50 | 1 | 2 | 3 | 3 | 4 | 4 | 5 | 6 | 6 | 6 | 6 | 6 | 6 | 6 | 6 | 7 | 7 | 7 | 7 | 7 | 7 | 7 | 7 | 7 | 7 | 7 | 8 | 8 | 8 | 8 |
| | ~52.5 | 2 | 2 | 3 | 4 | 4 | 5 | 5 | 6 | 6 | 6 | 6 | 7 | 7 | 7 | 7 | 7 | 7 | 7 | 8 | 8 | 8 | 8 | 8 | 8 | 8 | 8 | 8 | 9 | 9 | 9 |
| | ~55 | 2 | 2 | 3 | 4 | 4 | 5 | 5 | 6 | 6 | 6 | 6 | 7 | 7 | 7 | 7 | 7 | 7 | 7 | 8 | 8 | 8 | 8 | 8 | 8 | 8 | 8 | 8 | 9 | 9 | 9 |
| | ~57.5 | 2 | 2 | 3 | 4 | 4 | 5 | 5 | 6 | 6 | 6 | 6 | 7 | 7 | 7 | 7 | 7 | 7 | 7 | 8 | 8 | 8 | 8 | 8 | 8 | 8 | 8 | 8 | 9 | 9 | 9 |
| | ~60 | 2 | 2 | 3 | 4 | 4 | 5 | 5 | 6 | 6 | 6 | 6 | 7 | 7 | 7 | 7 | 7 | 7 | 7 | 8 | 8 | 8 | 8 | 8 | 8 | 8 | 8 | 8 | 9 | 9 | 9 |
| | ~62.5 | 2 | 3 | 3 | 4 | 5 | 5 | 6 | 6 | 7 | 7 | 7 | 7 | 7 | 8 | 8 | 8 | 8 | 8 | 8 | 9 | 9 | 9 | 9 | 9 | 9 | 9 | 9 | 9 | 9 | 9 |
| | ~65 | 2 | 3 | 3 | 4 | 5 | 5 | 6 | 6 | 7 | 7 | 7 | 7 | 7 | 8 | 8 | 8 | 8 | 8 | 8 | 9 | 9 | 9 | 9 | 9 | 9 | 9 | 9 | 9 | 9 | 9 |
| | ~67.5 | 2 | 3 | 3 | 4 | 5 | 5 | 6 | 7 | 7 | 7 | 7 | 7 | 7 | 8 | 8 | 8 | 8 | 8 | 8 | 9 | 9 | 9 | 9 | 9 | 9 | 9 | 9 | 9 | 9 | 9 |
| | ~70 | 2 | 3 | 3 | 4 | 5 | 5 | 6 | 7 | 7 | 7 | 7 | 7 | 7 | 8 | 8 | 8 | 8 | 8 | 8 | 9 | 9 | 9 | 9 | 9 | 9 | 9 | 9 | 9 | 9 | 9 |
| | ~72.5 | 2 | 3 | 4 | 4 | 5 | 5 | 6 | 7 | 7 | 8 | 8 | 8 | 8 | 8 | 8 | 9 | 9 | 9 | 9 | 9 | 9 | 9 | 9 | 9 | 9 | 9 | 9 | 10 | 10 | 10 |
| | ~75 | 2 | 3 | 4 | 4 | 5 | 5 | 6 | 7 | 7 | 8 | 8 | 8 | 8 | 8 | 8 | 9 | 9 | 9 | 9 | 9 | 9 | 9 | 9 | 9 | 9 | 9 | 9 | 10 | 10 | 10 |
| | ~77.5 | 2 | 3 | 4 | 4 | 5 | 5 | 6 | 7 | 7 | 8 | 8 | 8 | 8 | 8 | 8 | 9 | 9 | 9 | 9 | 9 | 9 | 9 | 9 | 9 | 9 | 9 | 9 | 10 | 10 | 10 |
| | ~80 | 2 | 3 | 4 | 4 | 5 | 5 | 6 | 7 | 7 | 8 | 8 | 8 | 8 | 8 | 8 | 9 | 9 | 9 | 9 | 9 | 9 | 9 | 9 | 9 | 9 | 9 | 9 | 10 | 10 | 10 |
| | ~82.5 | 2 | 3 | 4 | 4 | 5 | 6 | 6 | 7 | 8 | 8 | 8 | 8 | 8 | 9 | 9 | 9 | 9 | 9 | 10 | 10 | 10 | 10 | 10 | 10 | 10 | 10 | 10 | 10 | 10 | 10 |
| | ~85 | 2 | 3 | 4 | 4 | 5 | 6 | 6 | 7 | 8 | 8 | 8 | 8 | 8 | 9 | 9 | 9 | 9 | 9 | 10 | 10 | 10 | 10 | 10 | 10 | 10 | 10 | 10 | 10 | 10 | 10 |
| | ~85.1 | 2 | 3 | 4 | 4 | 5 | 6 | 6 | 7 | 8 | 8 | 8 | 8 | 8 | 9 | 9 | 9 | 9 | 9 | 10 | 10 | 10 | 10 | 10 | 10 | 10 | 10 | 10 | 10 | 10 | 10 |

FIG. 27

| | SURFACE-CROSSING EXPOSURE RATE | | | |
|---|---|---|---|---|
| | ~25% | 25~50% | 50~75% | 75%~ |
| CORRECTION COEFFICIENT r_N | 1 | 1.5 | 2 | 3 |

FIG. 28

| FILM LOSS CORRECTION COUNT (SAME AS SPECIFICATION OF PROCESS CORRECTION) | | | CORRECTION COEFFICIENT Cx | | | | |
|---|---|---|---|---|---|---|---|
| | | | AVERAGE IMAGE DENSITY | | | | |
| | | | ~10% | 10~25% | 25~40% | 40~75% | 75%~ |
| 0 | ~ | 1166667 | 1.0 | 1.1 | 1.2 | 1.3 | 1.4 |
| 1166668 | ~ | 2333333 | 1.1 | 1.2 | 1.3 | 1.4 | 1.5 |
| ⸾ | ⸾ | ⸾ | ⸾ | ⸾ | ⸾ | ⸾ | ⸾ |
| 22166668 | ~ | 23333333 | 1.9 | 2.0 | 2.1 | 2.2 | 2.3 |
| 23333334 | ~ | MAX | 2.0 | 2.1 | 2.2 | 2.3 | 2.4 |

| ENVIRONMENTAL AREA | CORRECTION COEFFICIENT ev | | | | |
|---|---|---|---|---|---|
| | AVERAGE IMAGE DENSITY | | | | |
| | ～10% | 10～25% | 25～40% | 40～75% | 75%～ |
| 1 | 0.5 | 0.5 | 0.6 | 0.6 | 0.8 |
| 2 | 0.5 | 0.6 | 0.7 | 0.8 | 1.0 |
| 3 | 0.6 | 0.7 | 0.8 | 1.0 | 1.0 |
| 4 | 0.7 | 0.8 | 0.9 | 1.0 | 1.1 |
| 5 | 0.8 | 0.9 | 1.0 | 1.1 | 1.2 |
| 6 | 0.9 | 1.0 | 1.1 | 1.2 | 1.3 |
| 7 | 1.0 | 1.1 | 1.2 | 1.3 | 1.4 |
| 8 | 1.3 | 1.2 | 1.3 | 1.4 | 1.5 |
| 9 | 1.2 | 1.3 | 1.4 | 1.5 | 1.6 |
| 10 | 1.3 | 1.4 | 1.5 | 1.6 | 1.7 |

| | SURFACE-CROSSING EXPOSURE RATE | | | | |
|---|---|---|---|---|---|
| | 1 | 2 | 3 | 4 | 5 |
| DIFFERENCE CORRECTION VALUE | -1.0 | -2.0 | 1.0 | 2.0 | 1.0 |

IMAGE-FORMING APPARATUS AND METHOD FOR SUPPRESSING GENERATION OF A DENSITY LEVEL DIFFERENCE CAUSED BY RECIPROCITY FAILURE

CROSS-REFERENCE TO RELATED APPLICATION

The present application claims priority from Japanese Applications JP2023-012365, JP2023-012366, and JP2023-012367 the content of which is hereby incorporated by reference into this application.

BACKGROUND OF THE INVENTION

1. Field of the Invention

The present disclosure relates to an image-forming apparatus and the like.

2. Description of the Related Art

An electrophotographic image-forming apparatus is known in which a light beam emitted from a light source, such as a laser diode, is focused on a photoconductor drum (image carrier) by a scanning optical system to form an electrostatic latent image on a surface of the photoconductor drum.

In this type of image-forming apparatus, a phenomenon of reciprocity failure occurs in which, even when a total amount of light applied to the photoconductor drum is the same, a latent image formation state differs depending on the relationship between an amount of light and an exposure time. Specifically, in a case of exposure for a very short period of time, as compared with a case of exposure over a relatively long period of time, an amount of change in potential of a photoreceptor is reduced in spite of the same total exposure amount, and thus the reciprocity failure occurs. When this is applied to a multi-beam scanning optical system, the reciprocity failure appears as image density unevenness.

In general, in order to cope with the image density unevenness caused by the reciprocity failure, a method is known in which a vertical cavity surface emitting laser (VCSEL) in which a large number of light emitting points are arranged in a main scanning direction and a sub-scanning direction is used as a light source, and multiple exposure is performed at a certain scanning frequency or more to make density differences invisible. However, in the related art, the number of beams, such as 32 beams, is enormous, and a driving system is complicated. Furthermore, there arises a problem in that cost is largely increased.

In another related art, in order to cope with the density unevenness caused by the reciprocity failure, an image-forming apparatus has been proposed in which an amount of toner to be developed on superposed lines of an m-th main scanning operation and an (m+1)-th main scanning operation is calculated and a first light amount of the (m+1)-th scanning operation and an N-th light amount of the m-th scanning operation are adjusted to reduce an adverse effect of the reciprocity failure. However, the following problems arise.

In the related art, when electronic bow correction is performed, synchronization between density correction and bow correction cannot be easily realized due to influence of partial magnification correction of the density correction and the bow correction and the asynchronism of a density correction circuit, and a streak image is likely to be generated at a boundary of the bow correction. In addition, highly accurate density correction in consideration of various variations cannot be easily realized, and a density level difference is likely to occur at the boundary of the bow correction.

Furthermore, as another technique, an image-forming apparatus is known which corrects an image writing position by forming a registration mark and detecting a deviation amount with respect to a normal position in order to suppress color misregistration based on various causes in image formation, but this technique does not mean the bow correction itself.

In general, in a case where a multi-beam scanning optical system is used, when electronic bow correction is performed, density unevenness occurs due to reciprocity failure caused by surface-crossing by an end semiconductor laser device (LD).

As a further technique, an operation exposure method is known in which, in scanning exposure, when exposure by an m-th light beam in light beams for performing an N-th main scanning operation and exposure by a first light beam in light beams for performing an (N+1)-th main scanning operation overlap each other, power of at least one of the first light beam and the m-th light beam is changed (N is an integer on one side).

As a still further technique, in an optical scanning device that performs multi-exposure, an exposure unit is controlled such that a difference between an exposure amount of a first exposure and an exposure amount of a second exposure performed based on image data when a type of an image is determined to be a character is larger than a difference between an exposure amount of a first exposure and an exposure amount of a second exposure performed based on image data when a type of an image is determined to be a picture by a determiner.

However, in the related arts, when the electronic bow correction is performed using the scanning optical system of the multi-beam, a countermeasure against the surface-crossing reciprocity failure due to the end LD is insufficient, and the density unevenness occurs.

SUMMARY OF THE INVENTION

An object of the present disclosure is to provide an image-forming apparatus and the like capable of suppressing generation of a density level difference caused by influence of reciprocity failure when electronic density correction and bow correction are performed.

According to an aspect of the present disclosure, an image-forming apparatus employing an electrophotographic method scans a surface of an image carrier with multi-beams emitted from a plurality of light emitting elements based on image data. The image-forming apparatus includes at least one bow corrector that performs electronic bow correction on the image data, at least one density smoothing processor that performs a density smoothing process to smooth a density level difference of an image subjected to the bow correction, at least one density correction processor that performs density correction on the image subjected to the bow correction by light amount correction of a surface-crossing exposure segment, and at least one of a light emitting element driver controller that controls light emission of a plurality of light emitting elements of a light beam emitter based on the image data subjected to the density smoothing process and a control signal subjected to the density correction.

According to another aspect of the present disclosure, a method for controlling an image-forming apparatus that scans a surface of an image carrier with light beams emitted from a plurality of light emitting elements based on image data includes performing electronic bow correction on the image data, performing a density smoothing process to smooth a density level difference of an image subjected to the bow correction, performing density correction on the image subjected to the bow correction by light amount correction of a surface-crossing exposure segment, and controlling light emission of a plurality of light emitting elements of a light beam emitter based on the image data subjected to the density smoothing process and a control signal subjected to the density correction.

According to a further aspect of the present disclosure, the image-forming apparatus can suppress a density level difference by performing the density smoothing process and the density correction on image data so that the density level difference does not occur in a halftone image due to influence of the reciprocity failure even when the electronic bow correction is performed.

BRIEF DESCRIPTION OF THE DRAWINGS

FIG. 15 is an explanatory view of density correction values corresponding to adjustment pitches of a laser diode.

FIGS. 18A and 18B are explanatory views of a pattern selection of the density smoothing process for image density distribution, wherein FIG. 18A is a graph of the image density distribution and FIG. 18B is a diagram illustrating an example of a setting of TONE patterns.

FIGS. 19A and 19B are other explanatory views of a pattern selection of the density smoothing process for image density distribution, wherein FIG. 19A is a graph of the image density distribution and FIG. 19B is a diagram illustrating an example of a setting of TONE patterns.

FIG. 25 is an explanatory view of an example of a table of a correction coefficient ev with respect to temperature and humidity in an image-forming apparatus.

FIG. 26 is an explanatory view of an example of a table for setting an environmental area with respect to temperature and humidity.

FIG. 27 is an explanatory view of an example of a table of a correction coefficient r_N corresponding to a surface-crossing exposure ratio.

FIG. 28 is an explanatory view of an example of a table of a correction coefficient Cx corresponding to a film loss amount of a drum and an image average density level according to a second example.

DETAILED DESCRIPTION OF THE INVENTION

Embodiments of the present disclosure will be described hereinafter with reference to the accompanying drawings.

Note that the embodiments below are merely examples for describing the present disclosure, and the technical scope of the disclosure set forth in the claims is not limited to the description below.

1. First Embodiment

Figure 1:
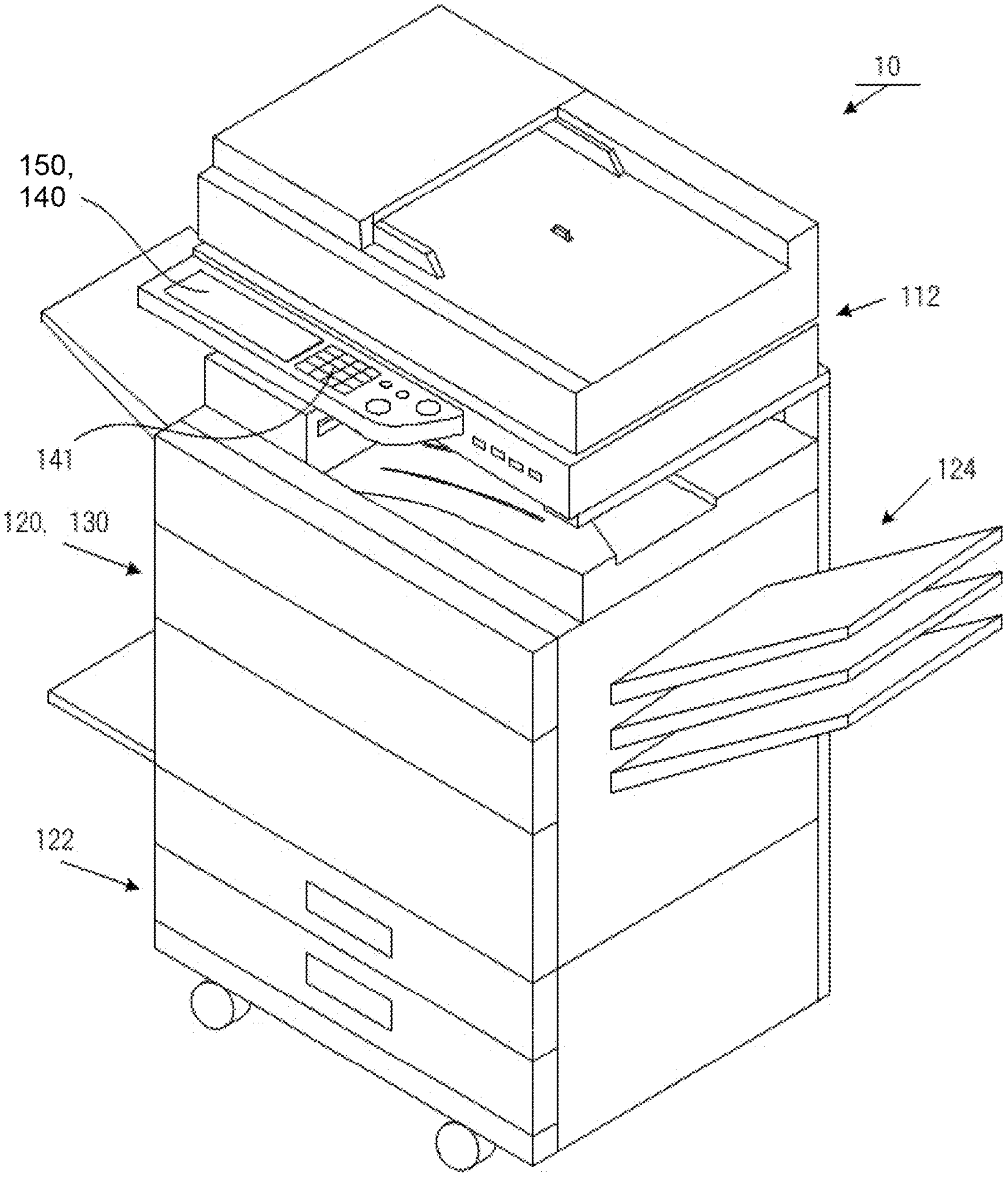
FIG. 1 is an external view of an image-forming apparatus on which an optical scanning device is mounted according to a first embodiment.

First, a configuration of an image-forming apparatus 10 according to a first embodiment will be described. FIG. 1 is an external view of the image-forming apparatus 10 including an optical scanning device 200 according to the first embodiment, and FIG. 2 is a block diagram for control of the image-forming apparatus 10 and the optical scanning device 200.

1.1 Overall Configuration

As illustrated in FIG. 1, the image-forming apparatus 10 is an information processing device that includes a document reader 112 at an upper portion of the image-forming apparatus 10 to read an image of a document and output the image by using an electrophotographic method. The image-forming apparatus 10 may be, for example, a multifunction printer.

Figure 2:
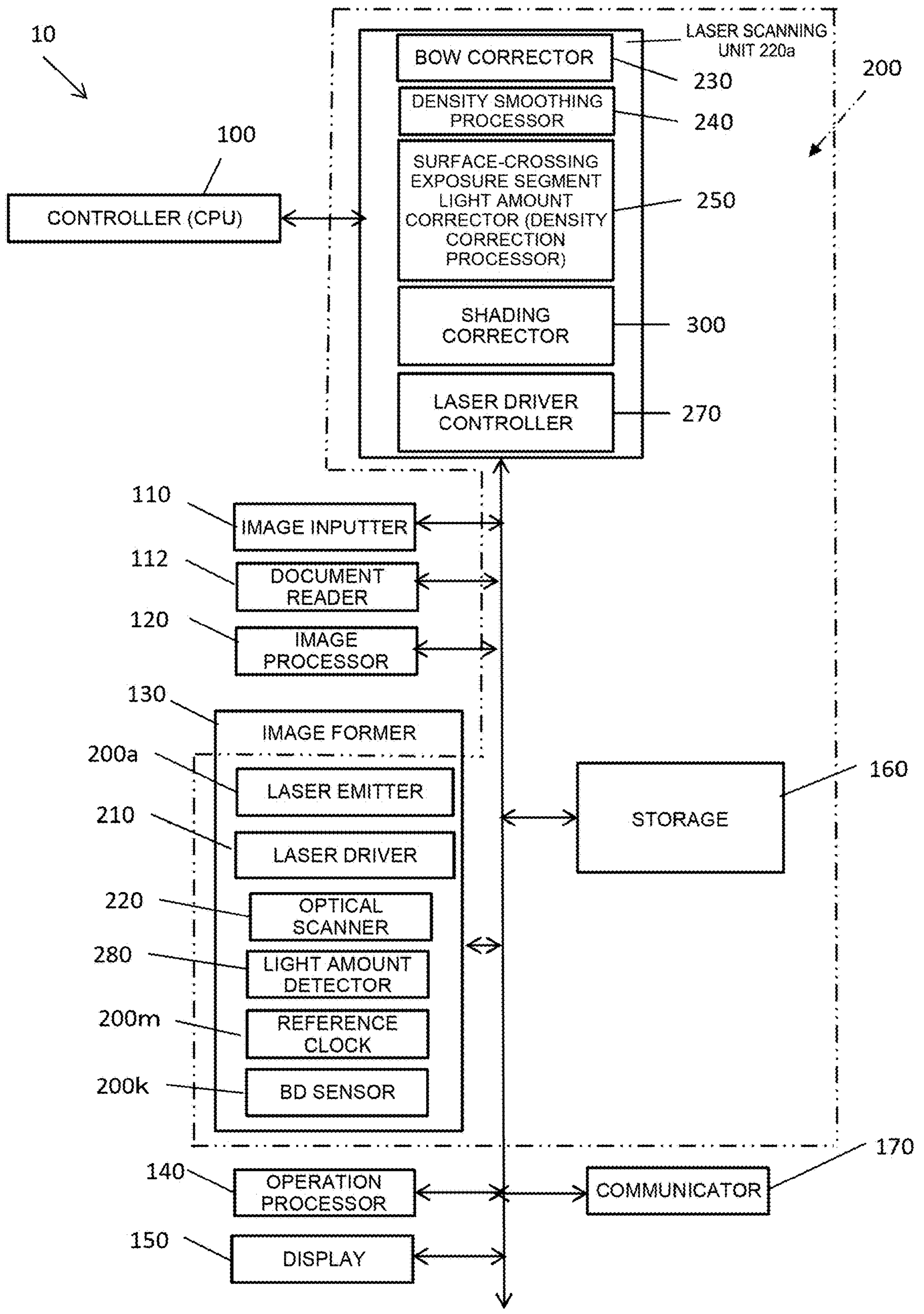
FIG. 2 is a block diagram for control of the image-forming apparatus and the optical scanning device.

As illustrated in a diagram of a control system in FIG. 2, the image-forming apparatus 10 mainly includes at least one controller 100, an image inputter 110, the document reader 112, an image processor 120, an image former 130, an operation processor 140, a display 150, a storage 160, and a communicator 170, and further has a function of the optical scanning device 200.

1.2 Image-Forming Apparatus 10

As illustrated in FIG. 2, the at least one controller 100 is a functional section for controlling the entire image-forming apparatus 10.

Moreover, the at least one controller 100 realizes various functions by reading and executing various programs, and includes, for example, one or more arithmetic devices (for example, a central processing unit (CPU)).

The image inputter 110 is a functional section that reads image data input to the image-forming apparatus 10. Moreover, the image inputter 110 is coupled to the document reader 112 being a functional section that reads an image in a document, and receives image data output from the document reader 112.

The image inputter 110 may receive image data from a storage medium, such as a USB memory or an SD card. Furthermore, the image inputter 110 may receive image data from another terminal device via the communicator 170 that performs connection to the other terminal device.

The document reader 112 has a function of optically reading a document placed on a contact glass (not illustrated), and supplying scan data to the image processor 120.

The image former 130 is a functional section that forms, on a recording medium (for example, a recording sheet), output data based on the image data. For example, as illustrated in FIG. 1, the recording sheet is fed from a paper feed tray 122, and after the image former 130 forms an image on a surface of the recording sheet, the recording sheet is ejected to a paper discharge tray 124. The image former 130 is configured by a laser printer that uses an electrophotography process employing an electrophotographic method.

In the electrophotographic process of the image former 130, the optical scanning device 200, described below, forms an electrostatic latent image by performing scanning with a laser beam (corresponding to laser light) corresponding to image data on a surface of a photoconductor drum (image carrier) (not illustrated), develops the electrostatic latent image with toner, and transfers and fixes a developed toner image onto a recording medium, so as to form an image.

The image processor 120 has a function of converting image data read by the document reader 112 to have a set file format (TIFF, GIF, JPEG, or the like). Then, the image processor 120 forms an output image based on the image data subjected to the image processing.

The operation processor 140 is a functional section that receives operational instructions issued by a user, and includes various key switches and a device that detects a touch input. The user uses the operation processor 140 to input a function to be used and an output condition.

The display 150 is a functional section that displays various types of information for the user, and includes, for example, a liquid crystal display (LCD).

Specifically, the operation processor 140 provides a user interface for operating the image-forming apparatus 10. The display 150 displays various setting menu screens of the image-forming apparatus 10 and messages.

Note that, as illustrated in FIG. 1, the image-forming apparatus 10 may include, as a configuration of the operation processor 140, a touch panel in which an operation panel 141 and the display 150 are integrally formed. In this case, a method for detecting an input on the touch panel may be a general detection method, such as a resistive method, an infrared method, an electromagnetic induction method, or an electrostatic capacitive method.

The storage 160 is a functional section that stores various programs including a control program required for operation of the image-forming apparatus 10, various data including the read data, and user information. The storage 160 includes, for example, at least one nonvolatile read only memory (ROM), at least one random access memory (RAM), and at least one hard disk drive (HDD). The storage 160 may further include a solid state drive (SSD) which is a semiconductor memory.

The communicator 170 performs a communication connection with an external device. A communication interface (communication I/F) used for sending and receiving data is provided as the communicator 170. With the communication I/F, data which is stored in the storage 160 of the image-forming apparatus 10 may be sent to and received from any other computer device connected via a network in response to an operation performed by the user on the image-forming apparatus 10.

1.3 Optical Scanning Device 200

As illustrated in FIG. 2, the optical scanning device 200 is mounted on the image-forming apparatus 10.

Figure 3:
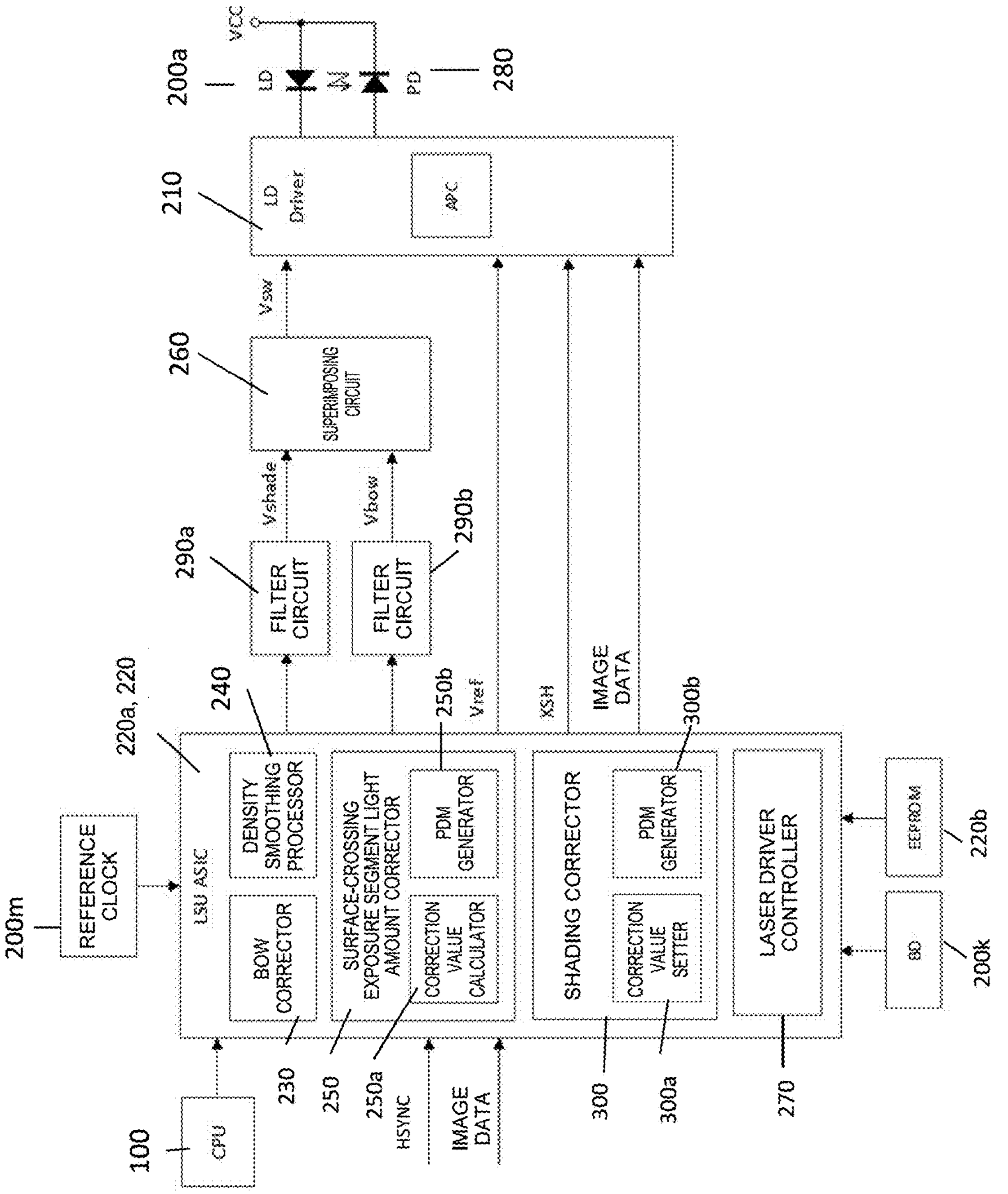
FIG. 3 is a circuit diagram illustrating a signal transmission path from a laser emitter to a laser driver of the optical scanning device.

Furthermore, FIG. 3 is an explanatory diagram illustrating a signal transmission paths from a laser scanning unit **220*a* to the laser driver 210 in the optical scanning device 200**.

As illustrated in FIGS. 2 and 3, the optical scanning device 200 includes a laser emitter **200*a* that includes a plurality of laser emitting elements (semiconductor laser devices (LDs) and emits a plurality of laser beams (corresponding to "multi-beams"), the laser driver 210 that controls the laser emitter 200*a*, an optical scanner 220 that scans the photoconductor drum (not shown) with the multi-beams emitted from the laser emitter 200*a* based on image data, a bow corrector 230 that electronically performs bow correction on the image data, a density smoothing processor 240 that smooths a density level difference in the image subjected to the bow correction by performing the density smoothing process, a surface-crossing exposure segment light amount corrector (density correction processor) 250 that corrects a density level of the image subjected to the bow correction by correcting a light amount on a surface-crossing exposure segment, and a shading corrector 300 that performs a shading correction process on the image, and a laser driver controller (light emitting element driver controller) 270 that controls light emission of a plurality of laser light emitting elements disposed on the laser emitter (LD) 200*a* by transmitting a control signal to the laser driver 210** based on the image data subjected to the bow correction and the density smoothing process and a control signal subjected to the density correction.

The laser emitter **200*a* includes a plurality of laser emitting elements, and a light amount detector 280** including a photodiode (PD) detects an amount of light emitted from the laser emitting elements.

A reference clock signal generator **200*m* generates a reference clock signal for control. A beam detection (BD) sensor 200*k* is disposed on a starting end side of a scanning area of a light beam and controls a timing when an electrostatic latent image is written on the photoconductor drum. Note that, In FIG. 3**, Vcc denotes a power supply voltage.

As illustrated in FIG. 3, the bow corrector 230, the density smoothing processor 240, the surface-crossing exposure segment light amount corrector (density correction processor) 250, the shading corrector 300, and the laser driver controller 270 are realized when the laser scanning unit 220*a* (LSU) having an electronic control configuration mounted on the optical scanning device 200 is controlled based on an instruction signal issued by the at least one controller 100. Details of the individual sections will be described later.

1.4 Details of Control

Figure 4:
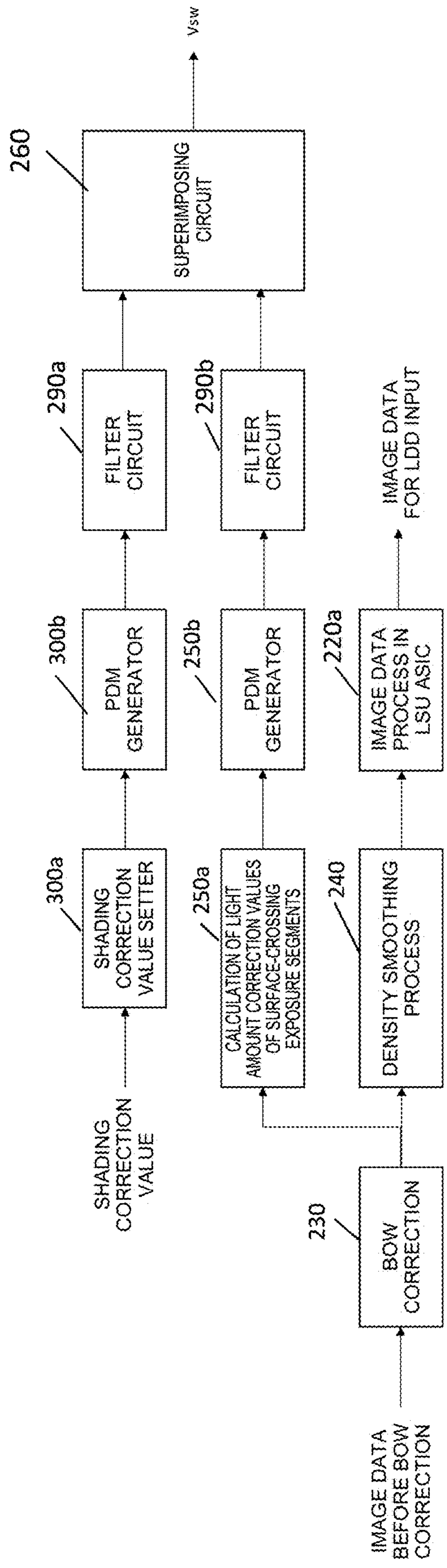
FIG. 4 is a diagram schematically illustrating signal processing and a signal flow in the optical scanning device.

FIG. 4 is a diagram schematically illustrating signal processing and a signal flow in the optical scanning device 200.

As illustrated in FIG. 4, an image before being subjected to the bow correction is subjected to the bow correction process by the bow corrector 230, the image after being subjected to the bow correction is subjected to the density smoothing process by the density smoothing processor 240, and the processed image is subjected to a predetermined process by the laser scanning unit 220*a* and is input to the laser driver (LDD) 210.

In the surface-crossing exposure segment light amount corrector 250, a light amount correction value calculator 250*a* calculates a light amount correction value of a surface-crossing exposure segment based on image data subjected to the bow correction by the bow corrector 230, a PDM generator 250*b* converts the light amount correction value into a PDM signal, a filter circuit 290*b* converts the light amount correction value into an analog signal, and then the analog signal is input to a superimposing circuit 260. Note that, as will be described below with reference to FIGS. 7 and 8, the light amount correction value of the surface-crossing exposure segment is used to correct a phenomenon in which exposure from the end element becomes dense due to the reciprocity failure in the light emitter employing a multi-beam method having a plurality of laser light emitting elements emitting light. For example, in a case of a laser light emitting element of eight beams (LD1 to LD8), light amount correction values for the light emitting elements LD1 and LD8 at end portions are calculated for the light amount correction, and light amount correction values for the other light emitting elements LD2 to LD7 are 0.

Furthermore, in the shading corrector 300, a correction value setter 300*a* sets a shading correction value obtained in advance through an experiment or the like, and a PDM generator 300*b* converts the shading correction value into a PDM signal and inputs the PDM signal to a filter circuit 290*a*. The filter circuit 290*a* converts the shading correction value represented by the PDM signal into an analog signal, and then input the analog signal to the superimposing circuit 260. The superimposing circuit 260 outputs a light amount correction signal (Vsw) serving as a reference signal of a laser driver 210.

1.5 Description of Processes of Sections

Processes of the individual sections will be described in detail below.

1.5.1 Electronic Bow Correction

The electronic bow correction performed by the bow corrector 230 will be described with reference to FIGS. 5A to 5E. As illustrated in FIG. 5A to 5E, the electronic bow correction is a process of suppressing a color shift by shifting image data in a sub-scanning direction in units of segments so as to cancel a curvature component different for each color.

Figure 5A:
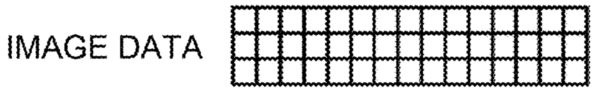
FIGS. 5A to 5E are explanatory views of electronic bow correction.
Figure 5B:
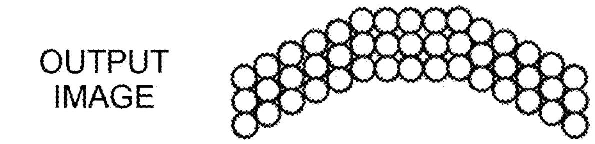
Figure 5C:
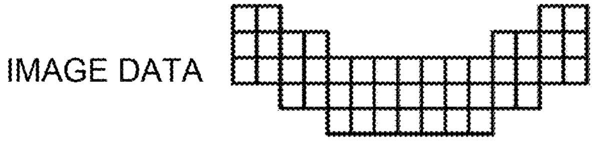
Figure 5D:
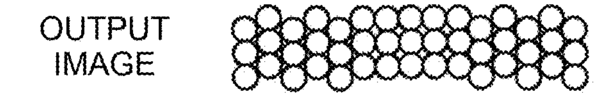
Figure 5E:
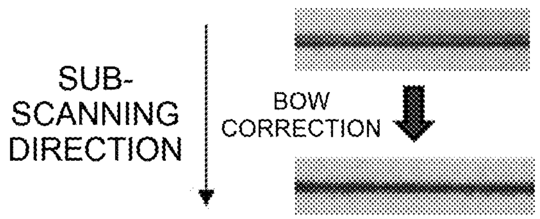

Specifically, even when input image data does not have a curve in the sub-scanning direction as illustrated in FIG. 5A, output image may have an arcuate curve in the sub-scanning direction as illustrated in FIG. 5B due to influence of an actual state of an optical system or the like. Therefore, the image data is subjected to the bow correction for bending the image data in an opposite direction as illustrated in FIG. 5C, so that a linear output image is obtained as illustrated in FIG. 5D. FIG. 5E is a diagram illustrating an example of output images before and after the bow correction.

1.5.2 Side Effect of Bow Correction

Figure 6A:
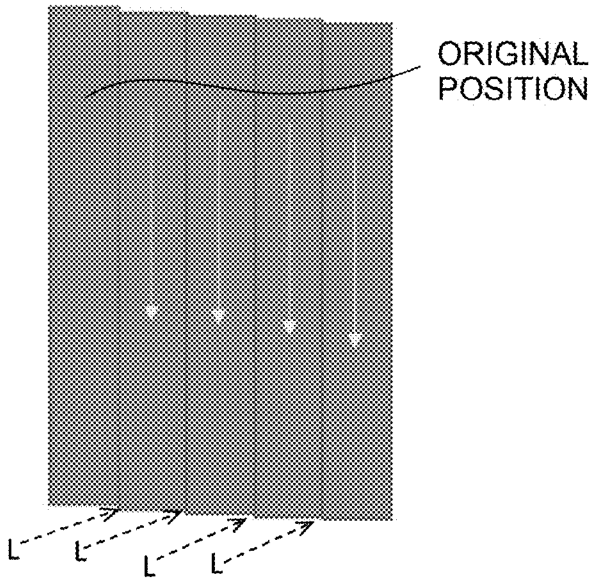
FIGS. 6A and 6B are explanatory views of a side effect of the bow correction.
Figure 6B:
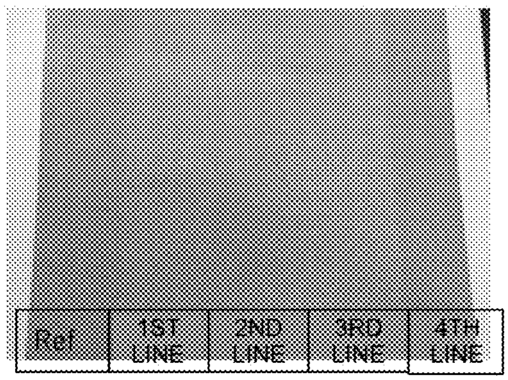

FIGS. 6A and 6B are diagrams illustrating a side effect of the bow correction.

As illustrated in FIGS. 6A and 6B, since only a process of sliding an image in the sub-scanning direction in units of segments is performed, a density level difference occurs. As illustrated in FIG. 6A, a density level difference is generated only by shifting portions of the image downward by one line in the sub-scanning direction (the shift is indicated by a reference symbol L). Note that, as illustrated in FIG. 6B, the density level difference is also generated by registration adjustment in the sub-scanning direction (an example of Ref, a first line, a second line, and so on is illustrated).

1.5.3 Cause of Density Level Difference

Figure 7:
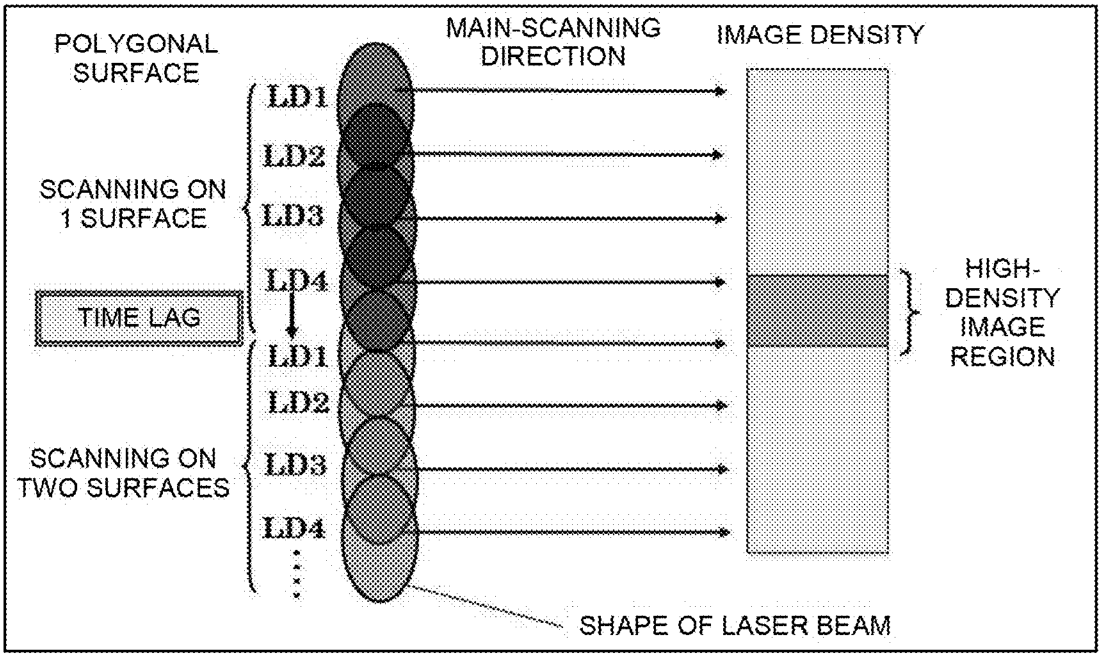
FIG. 7 is an image view of reciprocity failure for explaining a cause of a density level difference.

FIG. 7 is an explanatory view of a cause of the occurrence of the density level difference.

In a light emitter employing a multi-beam method including a plurality of laser light emitting elements, a phenomenon called reciprocity failure in which an area where scanning operations overlap becomes dense changes a distribution in which the density becomes dense in a dither pattern, and thus the density level difference occurs.

For example, in FIG. 7, a schematic diagram of image density unevenness occurring in a multi-beam scanning system using four channels (LD1 to LD4) of laser diodes is illustrated. Since a boundary region between LD1 and LD2 is exposed substantially at the same time, the boundary region is irradiated with a large light amount in a short period of time. On the other hand, in a boundary region between LD4 and LD1, since LD4 is exposed first and then LD1 having a different polygon surface is exposed, a time lag (time difference) occurs, and as a result, a small light amount is applied for a long period of time. As a result of such reciprocity failure, image density in the boundary region between LD4 and LD1 is higher than those in the other portions, resulting in density unevenness (refer to Hiroyuki Suhara, "Measurement of Electrostatic Latent Images in Electrophotography", July, 2015).

1.5.4 Grayscale Image

Figure 8:
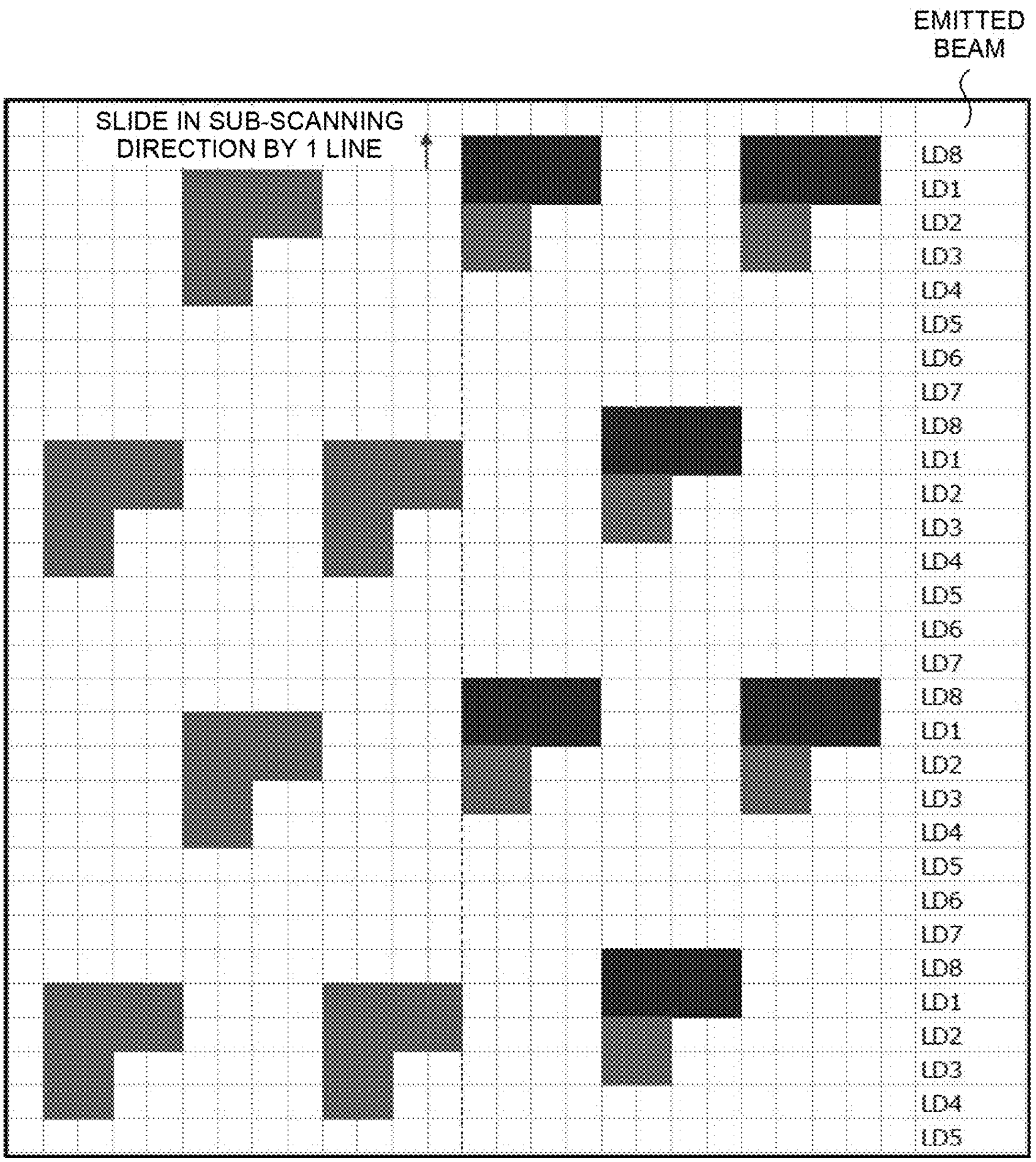
FIG. 8 is a grayscale image diagram for explaining the cause of the density level difference.

FIG. 8 is a diagram illustrating a micro-level grayscale image of a dither pattern using a multi-beam affected by the reciprocity failure. The light emitting element has an 8-beam configuration (LD1 to LD8).

According to FIG. 8, it is recognized that image density is higher in a portion straddling a boundary region between LD8 and LD1 than in the other portions and density unevenness occurs.

1.5.5 Density Smoothing Process and PDM Shading (for Bow Correction) Process

Figure 9A:
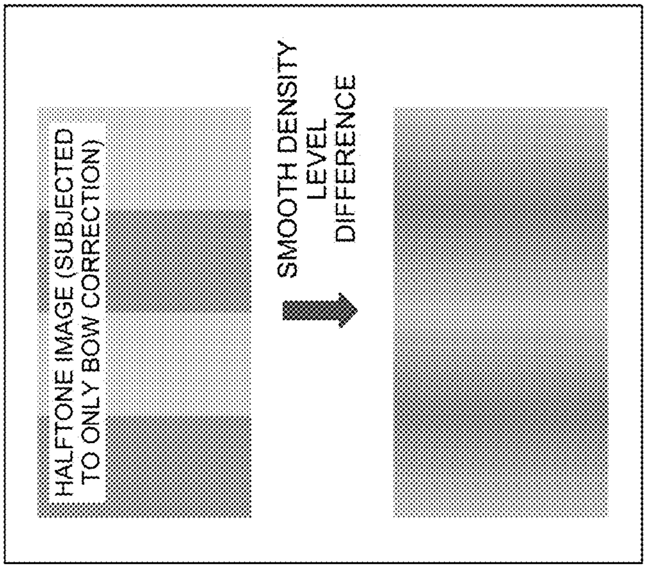
FIGS. 9A and 9B are explanatory views of a density smoothing process and density correction.
Figure 9B:
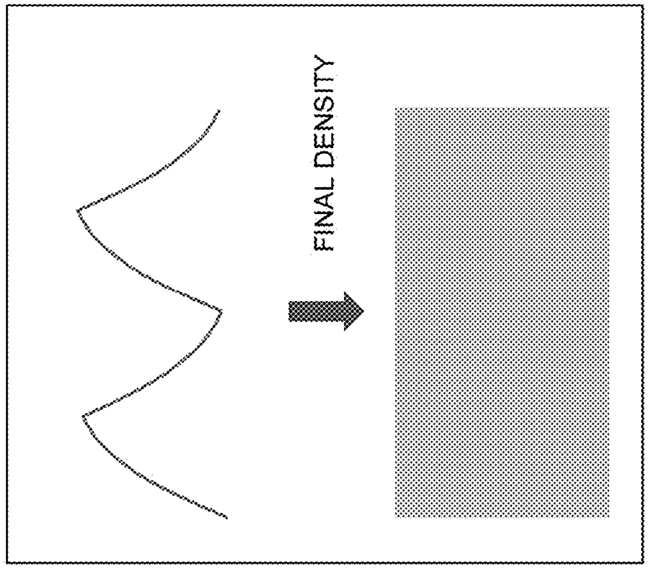

FIGS. 9A and 9B are explanatory views for smoothing a density level difference by the density smoothing process and correcting density by the shading process. As for the shading process, the density is preferably corrected by pulse density modulation (PDM) shading.

As illustrated in FIG. 9A, the density smoothing process is performed on a halftone image only subjected to the bow correction (first process) to smooth a density level difference. As illustrated in FIG. 9B, a light amount of the image subjected to the density smoothing process is corrected by an opposite phase, and the density correction is performed by the PDM shading process (for bow correction) (light amount correction of the surface-crossing exposure segment) (second process), thereby obtaining an image of the final density without shading.

In the first embodiment, a PDM shading signal for the bow correction used for the density correction is a density correction signal based on a PDM signal set to correct an amount of light so as to remove density unevenness caused by the reciprocity failure at a light emission timing of the plurality of light emitting elements. The correction of the light amount at the light emission timing of the plurality of light emitting elements so as to remove the density unevenness caused by the reciprocity failure has the same meaning as correction of a light amount of a surface-crossing exposure segment.

In addition, in the light amount correction of the surface-crossing exposure segment by an opposite phase, specifically, an image is output in a state in which both the bow correction and the light amount correction are performed on the surface-crossing exposure segment, and a pattern of a density smoothing process which will be described below is selected so that a shading difference is eliminated. Accordingly, a phase of the light amount correction of the surface-crossing exposure segment is opposite to that of the image subjected to the bow correction and the density smoothing process.

As an image of the density correction, any image is processed in the same manner according to a pattern of the density smoothing process obtained experimentally, and the light amount correction of the surface-crossing exposure segment is performed according to the presence or absence of the surface-crossing exposure. If there is no slide in the sub-scanning direction between adjacent segments in the bow correction, the density smoothing process is practically invalid between the segments.

Figure 10:
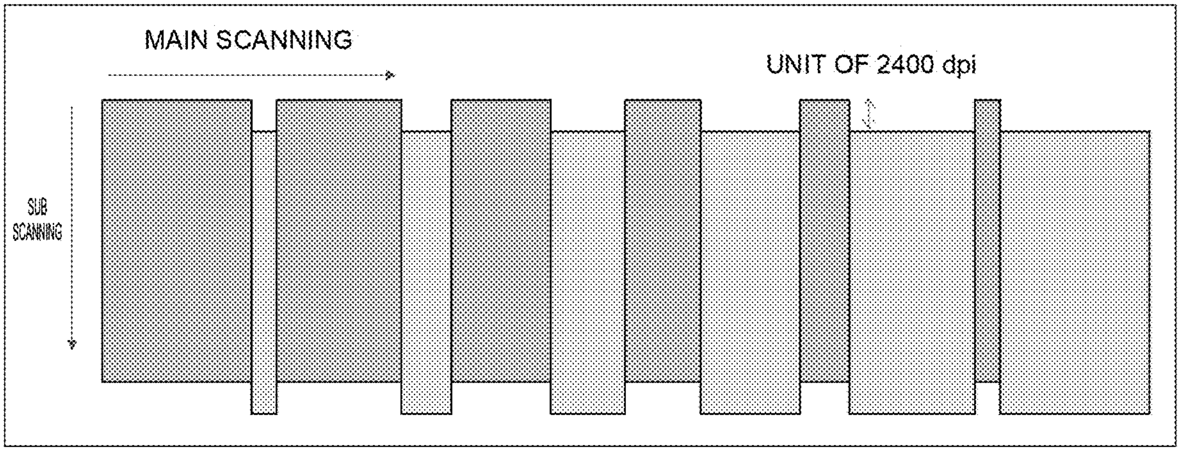
FIG. 10 is an explanatory view of the density smoothing process.

FIG. 10 is an explanatory view of the density smoothing process.

In the density smoothing process, as illustrated in a micro-level image of FIG. 10, an image slide is reciprocated several times at a micro-level (24000 dpi in FIG. 10) so that a density change is smoothed at a macro-level. Note that "dpi" is generally a unit of resolution, and is "dots per inch".

When only the bow correction is performed, the following problem occurs. Therefore, a streak image is likely to be generated in an item of the bow correction, and thus the density smoothing process is performed. Specifically, there arise problems in that synchronization between the density correction and the bow correction may not be easily realized, highly accurate density correction considering various variations may not be easily realized, and so on, since the portion is affected by magnification correction and asynchronism of the density correction circuit.

1.5.6 Specific Configuration and Processing of Laser Scanning Unit 220*a*

Here, in FIG. 3 described above, individual processes of the bow corrector 230, the density smoothing processor 240, the surface-crossing exposure segment light amount corrector 250, and the shading corrector 300 of FIG. 2 are mainly realized by the laser scanning unit 220*a*, and corresponding specific configurations will now be described.

As illustrated in FIG. 3, in the optical scanning device 200, the laser scanning unit (LSU) 220*a* of the optical scanner 220 is controlled by the at least one controller 100.

A reference clock (200*m*) and a BD signal (200*k*) are input to the laser scanning unit 220*a*.

In the laser scanning unit 220*a*, the bow corrector 230 performs the electronic bow correction process in response to a control signal supplied from the at least one controller 100. The density smoothing processor 240 performs the density smoothing process on an image subjected to the bow correction process in response to an instruction issued by the at least one controller 100. The surface-crossing exposure segment light amount corrector 250 performs the density correction with respect to the reciprocity failure on the image subjected to the electronic bow correction performed by the bow corrector 230. The shading corrector 300 performs the shading correction process on the image. Therefore, the shading corrector 300 generates a shading correction signal Vshade, the bow corrector 230 generates a control signal (digital signal), such as a bow correction signal Vbow for the electronic bow correction, and the laser driver controller 270 controls output of control signals (such as signals for bow correction, density correction by light amount correction of the surface-crossing exposure segment, and shading correction) to be input to the laser driver 210. Based on the control signal output from the laser driver controller 270, the laser driver 210 controls a multi-beam light emitting operation of the laser emitter 200*a*.

The laser scanning unit 220*a* is configured as an application-specific integrated circuit (LSU ASIC). The integrated circuit (LSU ASIC) of the laser scanning unit 220*a* receives a control signal supplied from the at least one controller 100, image data, a horizontal synchronization signal HSYNC, a reference clock signal supplied from the reference clock signal generator 200 *m*, a detection signal supplied from the beam detection (BD) sensor 200*k*, and the like.

The Vshade signal is an analog voltage signal for shading.

The shading corrector 300 of the laser scanning unit (LSU) 220*a* outputs a shading correction value read from a table (stored in the storage 220*b*, such as an EEPROM) set in the correction value setter 300*a* as a PDM wave signal via the PDM generator 300*b*. The PDM wave signal of the shading correction value is converted into an analog shading voltage signal (Vshade) by an external filter circuit 290*a*, and is input to the superimposing circuit 260. Note that the shading correction value is obtained in advance by an experiment or the like, and may be stored in the ROM or the like of the storage 160 of the image-forming apparatus 10 in addition to the storage 220*b*.

The Vbow signal is an analog voltage signal for the bow correction.

The bow corrector 230 of the laser scanning unit (LSU) 220*a* outputs a bow correction PDM signal, which is converted into the analog bow correction voltage signal (Vbow) by the external filter circuit 290*b* and input to the superimposing circuit 260.

A signal obtained by superimposing the analog shading voltage signal (Vshade) and the analog bow correction voltage signal (Vbow) by the superimposing circuit 260 is input to the laser driver 210 to control and correct multi-beam light emission.

Furthermore, the surface-crossing exposure segment light amount corrector 250 calculates a correction value of a light amount in the surface-crossing exposure segment (correction value calculator 250*a*). The calculated light amount correction value is input to the laser driver 210 as a light amount correction signal via the PDM generator 250*b* and a filter circuit (not illustrated), and the multi-beam light emission is controlled and corrected by the laser driver 210.

Figure 11:
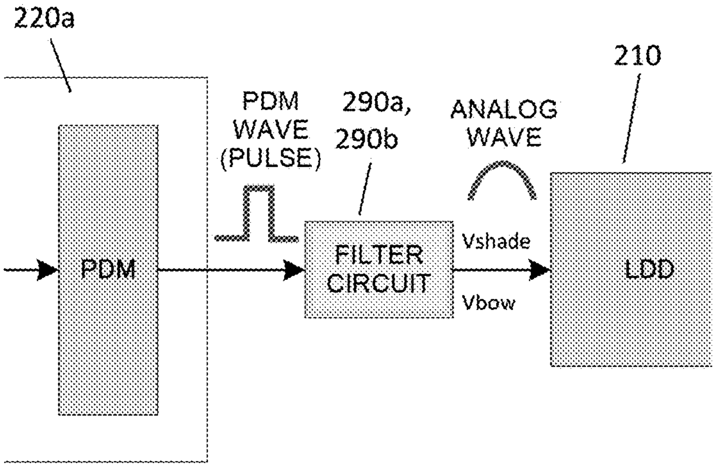
FIG. 11 is an image diagram illustrating PDM shading.

FIG. 11 is a diagram illustrating an image of analog conversion of a PDM signal. As illustrated in FIG. 11, a digital shading signal (PDM signal) and a digital bow correction signal (PDM signal) output from the laser scanning unit 220*a* are converted into an analog shading voltage signal (Vshade) and an analog bow correction signal (Vbow) by the filter circuit 290*a* and the filter circuit 290*b*, respectively.

Figure 12:
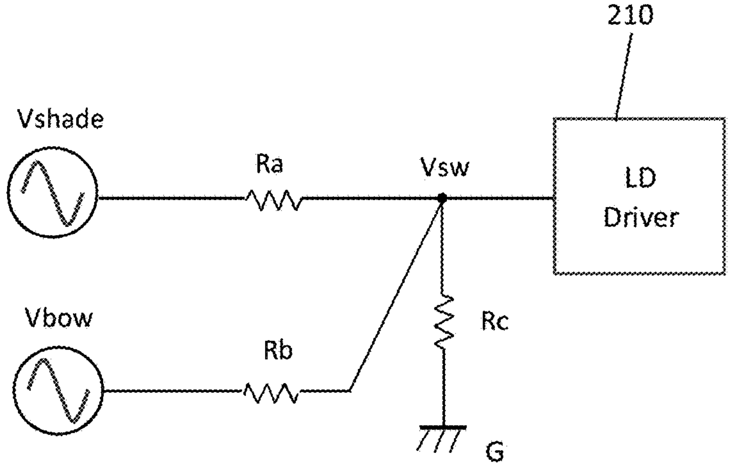
FIG. 12 is an explanatory view of a configuration of a superimposing circuit.

FIG. 12 is a diagram illustrating a basic configuration of the superimposing circuit 260. As illustrated in FIG. 12, the shading voltage signal (Vshade) and the bow correction signal (Vbow), which are analog voltage signals, pass through resistors Ra and Rb, respectively, and are superimposed at an addition point of a ground resistor Rc to form a light amount correction signal (Vsw) of an analog reference signal (analog voltage signal), which is input to the laser driver 210. Note that a reference character G denotes the ground.

The light amount correction signal (Vsw) to be input to the laser driver 210 is obtained by the following formula (1) based on the principle of superimposition of the Vshade signal and the Vbow signal performed by the superimposing circuit 260 including the resistors Ra, Rb, and Rc.

$$Vsw=(Vshade\times RbRc\times Vbow\times RcRa)/(RaRb+RbRc+RcRa) \quad (1)$$

Figure 13:
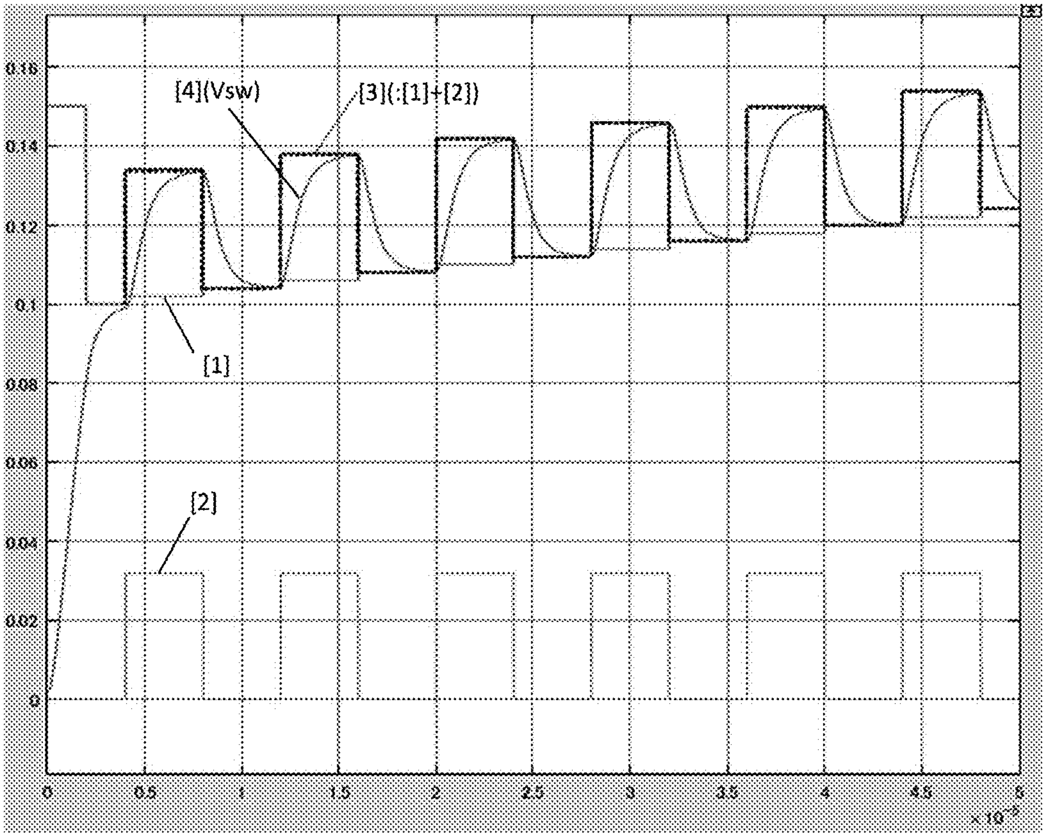
FIG. 13 is an explanatory view of a state of a change in an analog light amount correction signal (Vsw).

FIG. 13 is a graph illustrating a state in which the analog light amount correction signal (serving as an analog reference signal) (Vsw) input to the laser driver 210 changes.

In the case of FIG. 13, a simulation waveform obtained by superimposing a mechanism of the PDM shading for the bow correction on a mechanism of general shading (shading setting signal) is illustrated.

In FIG. 13, a signal [1] is a general shading setting signal, a signal [2] is a bow correction PDM setting signal, a signal [3] is a combined signal obtained by adding the shading setting signal [1] and the bow correction PDM setting signal [2], and a signal [4] is an analog light amount correction signal (Vsw) input to the laser driver 210.

1.5.7 Relationship Between Density Correction and Number of Segments

FIGS. 14A to 14D are diagrams illustrating the relationship between the density correction and the number of segments.

Figure 14A:
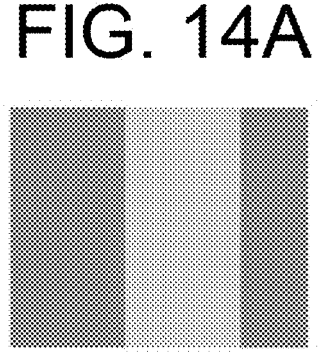
FIGS. 14A to 14D are explanatory views of the number of segments at a time of density correction.
Figure 14B:
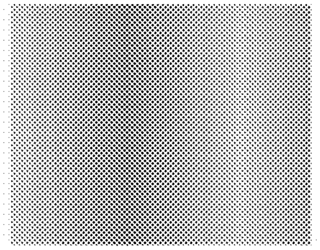

First, as illustrated in FIG. 14A, the density smoothing process is performed on image data (halftone image) which has been subjected to only the bow correction and which has a level difference to smooth the level difference in density, and as illustrated in FIG. 14B, the light amount correction (density correction) is performed in reverse phase on the image subjected to the bow correction/density smoothing process.

In the density correction, the number of segments for the density correction is larger than the number of segments for the bow correction/density smoothing process.

Figure 14C:
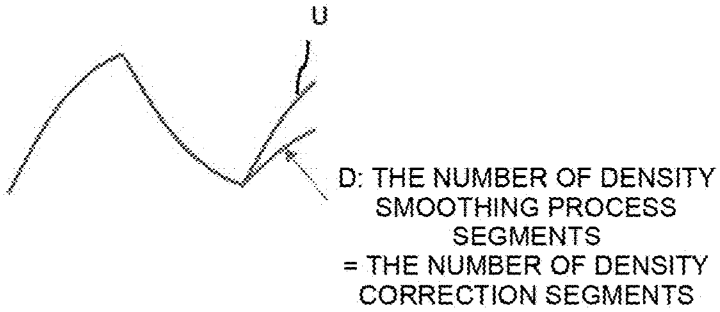

The reason why the number of segments for the density correction is larger than the number of segments for the bow correction/density smoothing process will now be described. This is because, as illustrated in FIG. 14C, when the number of segments for the density smoothing process is equal to the number of segments for the density correction, the density is reduced (a portion indicated by a reference symbol "D"), and there is a case where a halftone region is interrupted in the middle of the segments for the density smoothing process, so that a density correction amount is deviated. In order to prevent the deviation, when the number of segments of the density correction is larger than the number of segments of the bow correction/density smoothing process, the density is increased (indicated by a reference symbol "U"), the deviation is eliminated, and the density correction can be performed without interruption.

Figure 14D:
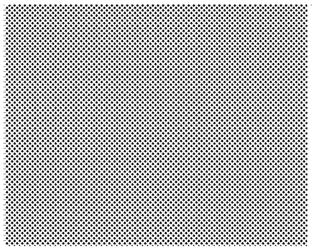

As for final density, as illustrated in FIG. 14D, there is no deviation in the density correction, and the density correction can be performed without interruption, so that the density correction can be performed to obtain a halftone image without unevenness.

FIG. 15 is an explanatory diagram of correction values of the density correction according to an adjustment pitch of an end-side LD in the multi-beam laser emitter 200*a* in which the plurality of laser light emitting elements (LDs) are arranged in the sub-scanning direction. In the first embodiment, the light amount correction in the surface-crossing exposure segment is specifically performed in accordance with the correction values of the density correction.

Although a phenomenon in which an area subjected to scanning in an overlapping manner becomes dense, which is called reciprocity failure, is required to be corrected, when an adjustment pitch of the end-side LD varies, density correction according to the pitch is required. For example, in a case of a configuration of 2400 dpi with eight beams, as illustrated in a table of FIG. 15, density correction values H to A are determined for adjustment pitch values (μm) between LD8 to LD1 of up to 7 (μm) to up to 14 (μm). For example, the correction value F is determined when an adjustment pitch of up to 9 (μm), and the correction value A is determined when the adjustment pitch is up to 14 (μm).

1.6 Operations and Effects of First Embodiment

The image-forming apparatus according to the first embodiment can suppress a density level difference by performing the density smoothing process and the density correction on image data so that the density level difference does not occur in a halftone image due to influence of the reciprocity failure even when the electronic bow correction is performed.

First Feature Point

In the first embodiment, in an image-forming apparatus that performs the electronic bow correction, a density level difference is smoothed by the density smoothing process, and at the same time, the density correction is performed by the shading process (refer to FIGS. 5 to 10).

According to the first feature point, synchronization between the density correction and the bow correction is not required, and a streak image is not generated at a boundary of the bow correction (refer to FIG. 9). Thus, highly accurate density correction is not required and density unevenness is made inconspicuous. This can be realized by a simple circuit configuration.

Second Feature Point

The shading process for the density correction is performed by the PDM method (refer to FIGS. 3, 11, 12, and 13).

According to the second feature point, the density correction can be realized by the light amount correction process performed on a surface-crossing exposure segment with the simple circuit configuration including the PDM generator 250*b* and the filter circuit 290*b*.

Third Feature Point

In a third feature point, the number of segments for the density correction is larger than the number of segments for the density smoothing process in the configuration of the first feature point (refer to FIG. 14).

According to the third feature point, even when a halftone region is interrupted in the middle of the number of segments in the density smoothing process, a density correction amount does not deviate.

Fourth Feature Point

In a fourth feature point, the density correction amount is varied according to the adjustment pitch of the end-side LD affected by the reciprocity failure in the configuration of the first feature point (refer to FIG. 15).

According to the fourth feature point, the density correction can be performed in accordance with a degree of influence of the reciprocity failure.

2. Second Embodiment

2.1 Configuration of Image-Forming Apparatus

An image-forming apparatus according to a second embodiment will be described. Note that the image-forming apparatus according to the second embodiment has substantially the same configuration as the image-forming apparatus according to the first embodiment and is different from the image-forming apparatus according to the first embodiment in a density smoothing process. Components having the same configurations are denoted by the same reference numerals, and description thereof will be omitted.

In the second embodiment, in an optical scanning device 200 illustrated in FIGS. 2 and 3, at least one controller 100 further has a function of smoothing a density level difference of an image by controlling a density smoothing processor 240 in accordance with a change rate of density correction of a surface-crossing exposure segment light amount corrector 250.

Specifically, in the second embodiment, as illustrated in FIGS. 2 and 3, the optical scanning device 200 includes a laser emitter 200*a* that includes a plurality of laser emitting elements (semiconductor laser devices (LDs) and emits a plurality of laser beams (corresponding to "multi-beams") which are arranged in a sub-scanning direction of a photoconductor drum (not illustrated), a laser driver 210 that controls the laser emitter 200*a*, an optical scanner 220 that scans the photoconductor drum (not illustrated) with the multi-beams emitted from the laser emitter 200*a* based on image data, a bow corrector 230 that electronically performs bow correction on image data, a density smoothing processor 240 that smooths a density level difference in an image subjected to the bow correction by performing a density smoothing process, a surface-crossing exposure segment light amount corrector (density correction processor) 250 that corrects a density level of the image subjected to the bow correction by correcting a light amount of the surface-crossing exposure segment, at least one controller 100 that smooths a density level difference of the image by controlling the density smoothing processor 240 in accordance with a change rate of density correction performed by the surface-crossing exposure segment light amount corrector 250, a shading corrector 300 that performs a shading correction process on the image, a laser driver controller 270 that controls light emission of the plurality of laser light emitting elements disposed on the laser light emitter (LD) 200*a* by transmitting a control signal to the laser driver 210 based on the image data subjected to the bow correction and the density smoothing process and the control signal subjected to the density correction.

2.2 Details of Control

In the second embodiment, the bow corrector 230 performs an electronic bow correction process on image data. The density smoothing processor 240 performs a density smoothing process on an image subjected to the bow correction process based on an instruction issued by the at least one controller 100. The surface-crossing exposure segment light amount corrector 250 performs the density correction by performing surface-crossing exposure segment light amount correction on the image subjected to the bow correction process. The shading corrector 300 performs a general shading correction process.

The at least one controller 100 smooths a density level difference of an image by controlling the density smoothing processor 240 in accordance with a change rate of density correction of the surface-crossing exposure segment light amount corrector 250 (controlling a selection of one of TONE patterns illustrated in FIGS. 16 and 17 described below, for example, in accordance with inclinations of image density illustrated in FIGS. 18 and 19).

Figure 16:
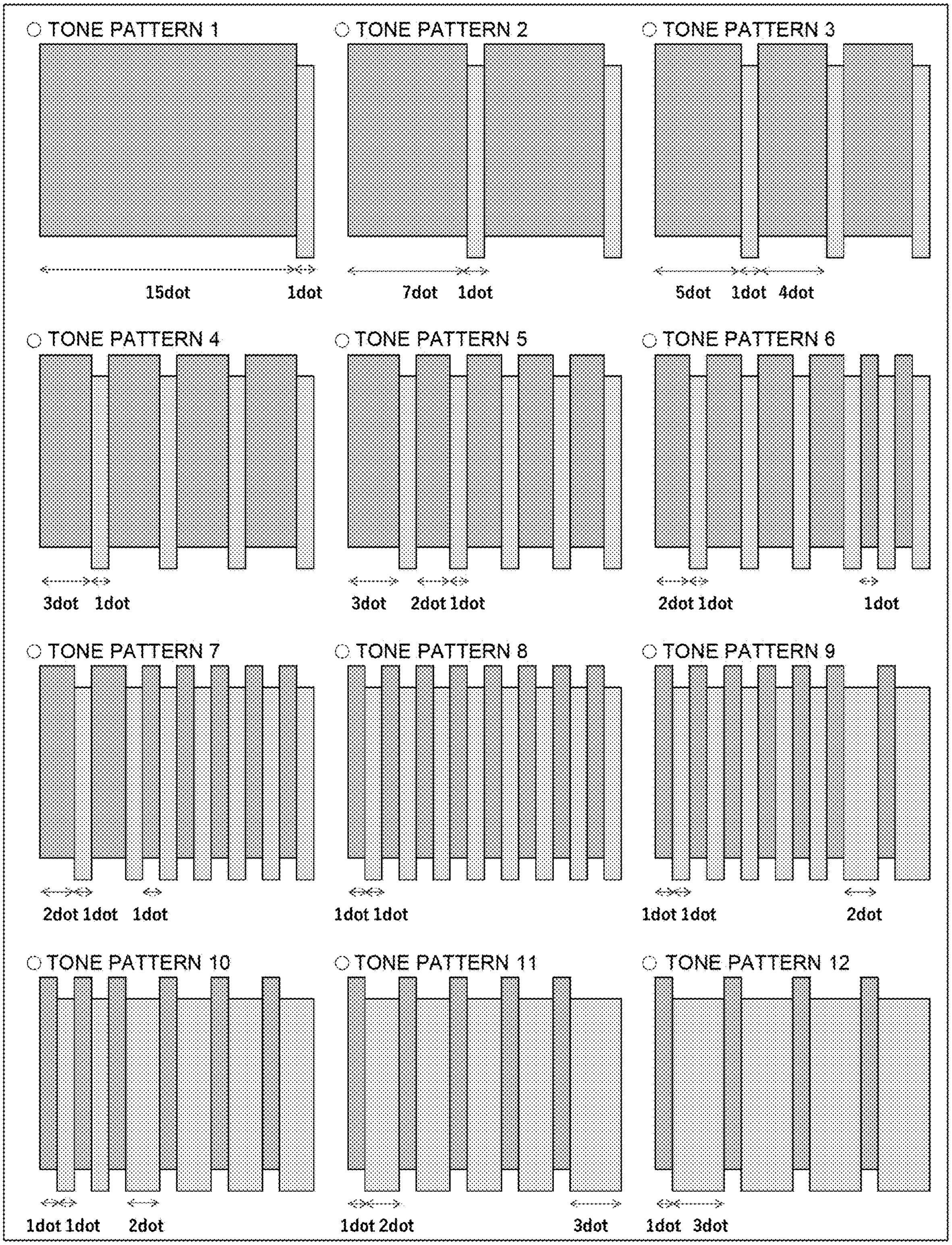
FIG. 16 includes explanatory views of examples of a pattern used in a density smoothing process performed by an image-forming apparatus according to a second embodiment.
Figure 17:
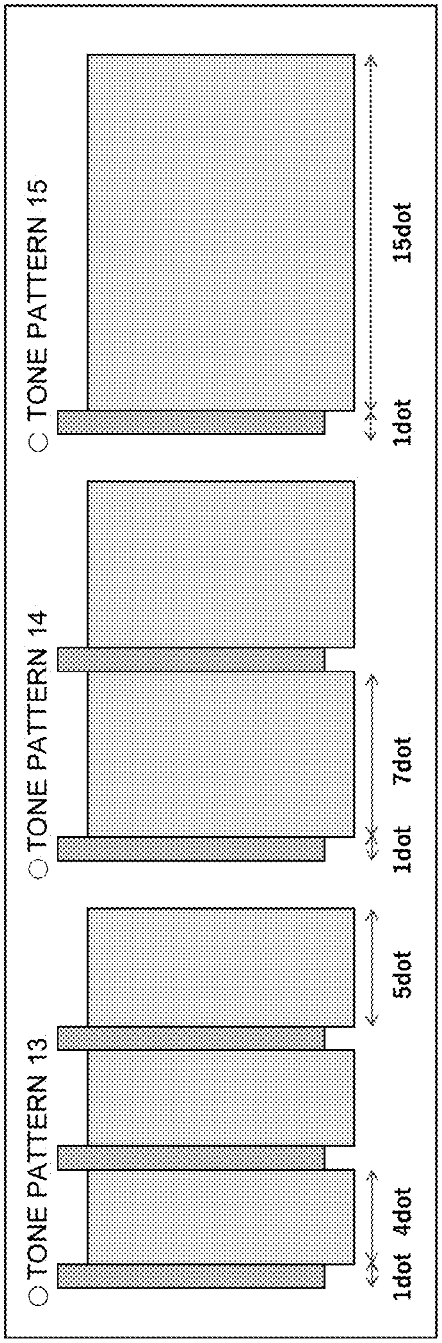
FIG. 17 includes other explanatory views of examples of the pattern used in the density smoothing process.

FIGS. 16 and 17 are diagrams illustrating examples of patterns of the density smoothing process.

The density smoothing process is performed by the density smoothing processor 240 in a unit of 600 dpi, and determines some of the patterns to be processed illustrated in FIGS. 16 and 17, order of the patterns to be processed, and the number of times each pattern is performed in accordance with an instruction issued by the at least one controller 100.

That is, as described above with reference to FIG. 10, when the density smoothing processor 240 of the second embodiment reciprocates image slide several times at a micro level to perform the density smoothing process so that a density change becomes smooth at the micro level, the at least one controller 100 controls a selection of a pattern to be used in the density smoothing process of the density smoothing processor 240 in accordance with a change rate of the density correction of the surface-crossing exposure segment light amount corrector (density correction processor) 250.

As described above, the reason why the density smoothing process is performed is to cope with problems, such as a case where, since a portion is affected by a magnification correction and asynchronism of a density correction circuit, synchronization between the density correction and the bow correction may not be easily realized, and a case where highly accurate density correction considering various variations may not be easily realized. However, when only the density smoothing process is uniformly performed using a single pattern as illustrated in FIG. 10, density unevenness may occur at the micro level in an image having different density change rates.

Therefore, in the second embodiment, in order to prevent the density unevenness caused by the density smoothing process, a pattern corresponding to the density change rate is appropriately selected from the plurality of patterns for the density smoothing process to prevent the density unevenness.

In the example of the second embodiment, as illustrated in FIGS. 16 and 17, 15 types of patterns (TONE patterns) of the density smoothing process (TONE patterns 1 to 15) are prepared. Each of TONE patterns 1 to 15 is configured such that an image region has 16 dots in total in the main scanning direction, the image region is divided into one or more regions by various dot widths in the main scanning direction, and one or more of the divided regions which are appropriately selected are slid in the sub-scanning direction with respect to one or more non-sliding regions.

Specifically, an image slide cycle of the density smoothing process is set to a range of 1 to 15 dots in 600 dpi terms.

Thus, since switching is performed in a unit larger than 1 dot of 600 dpi, dots are less likely to be isolated, and white streaks are less likely to occur. Furthermore, since the switching is performed in a unit smaller than the 15 dots of 600 dpi, a banding phenomenon is less likely to occur.

TONE patterns (TONE patterns 1 to 12 are illustrated in FIG. 16, and TONE patterns 13 to 15 are illustrated in FIG. 17) employed in the second embodiment will be described.

Among TONE patterns 1 to 12 illustrated in FIG. 16, TONE pattern 1 includes a non-sliding region of 15 dots and a region of 1 dot which is slid with respect to the non-sliding region of 15 dots.

TONE pattern 2 includes two sets of a non-sliding region of 7 dots and a region of 1 dot which is slid with respect to the non-sliding region of 7 dots.

TONE pattern 3 includes non-sliding region of 5 dots and a region of 1 dot which is slid with respect to the non-sliding region of 5 dots, and a block, which is arranged adjacent to the sliding region of 1 dot, of two sets of a non-sliding region of 4 dots and a region of 1 dot which is slid with respect to the non-sliding region of 4 dots.

TONE pattern 4 includes four sets of a non-sliding region of 3 dots and a region of 1 dot which is slid with respect to the non-sliding region of 3 dots.

TONE pattern 5 includes a non-sliding region of 3 dots, a region of 1 dot which is slid with respect to the non-sliding region of 3 dots, and a block, which is arranged adjacent to the sliding region of 1 dot, of four sets of a non-sliding region of 2 dots and a region of 1 dot which is slid with respect to the non-sliding region of 2 dots.

TONE pattern 6 includes a first block of four sets of a non-sliding region of 2 dots and a region of 1 dot which is slid with respect to the non-sliding region of 2 dots, and a second block, which is arranged adjacent to the first block, of two sets of a non-sliding region of 1 dot and a region of 1 dot which is slid with respect to the non-sliding region of 1 dot.

TONE pattern 7 includes a first block of two sets of a non-sliding region of 2 dots and a region of 1 dot which is slid with respect to the non-sliding region of 2 dots, and a second block, which is arranged adjacent to the first block, of five sets of a non-sliding region of 1 dot and a region of 1 dot which is slid with respect to the non-sliding region of 1 dot.

TONE pattern 8 includes eight sets of a non-sliding region of 1 dot and a region of 1 dot which is slid with respect to the non-sliding region of 1 dot.

TONE pattern 9 includes a first block of five sets of a non-sliding region of 1 dot and a region of 1 dot which is slid with respect to the non-sliding region of 1 dot, and a second block, which is arranged adjacent to the first block, of two sets of a non-sliding region of 1 dot and a region of 2 dots which is slid with respect to the non-sliding region of 1 dot.

TONE pattern 10 includes a first block of two sets of a non-sliding region of 1 dot and a region of 1 dot which is slid with respect to the non-sliding region of 1 dot, and a second block, which is arranged adjacent to the first block, of four sets of a non-sliding region of 2 dots and a region of 1 dot which is slid with respect to the non-sliding region of 2 dots.

TONE pattern 11 includes a block of four sets of a non-sliding region of 1 dot and a region of 2 dots which is slid with respect to the non-sliding region of 1 dot, and a set, which is arranged adjacent to the block, of a non-sliding region of 1 dot and a region of 3 dots which is slid with respect to the non-sliding region of 1 dot.

TONE pattern 12 includes four sets of a non-sliding region of 1 dot and a region of 3 dots which is slid with respect to the non-sliding region of 1 dot.

In TONE patterns illustrated in FIG. 17, TONE pattern 13 includes a block of two sets of a non-sliding region of 1 dot and a region of 4 dots which is slid with respect to the non-sliding region of 1 dot, and a set, which is arranged adjacent to the block, of a non-sliding region of 1 dot and a region of 5 dots which is slid with respect to the non-sliding region of 1 dot.

TONE pattern 14 includes two sets of a non-sliding region of 1 dot and a region of 7 dots which is slid with respect to the non-sliding region of 1 dot.

TONE pattern 15 includes a non-sliding region of 1 dot and a region of 15 dots which is slid with respect to the non-sliding region of 1 dot.

TONE patterns of the embodiment described above are examples, and other TONE patterns may be set. For example, the number of dots in the main scanning direction and the dot width may be modified and set to other values.

FIGS. 18 and 19 are used to describe a method for setting the density smoothing process according to the second embodiment.

Figure 18A:
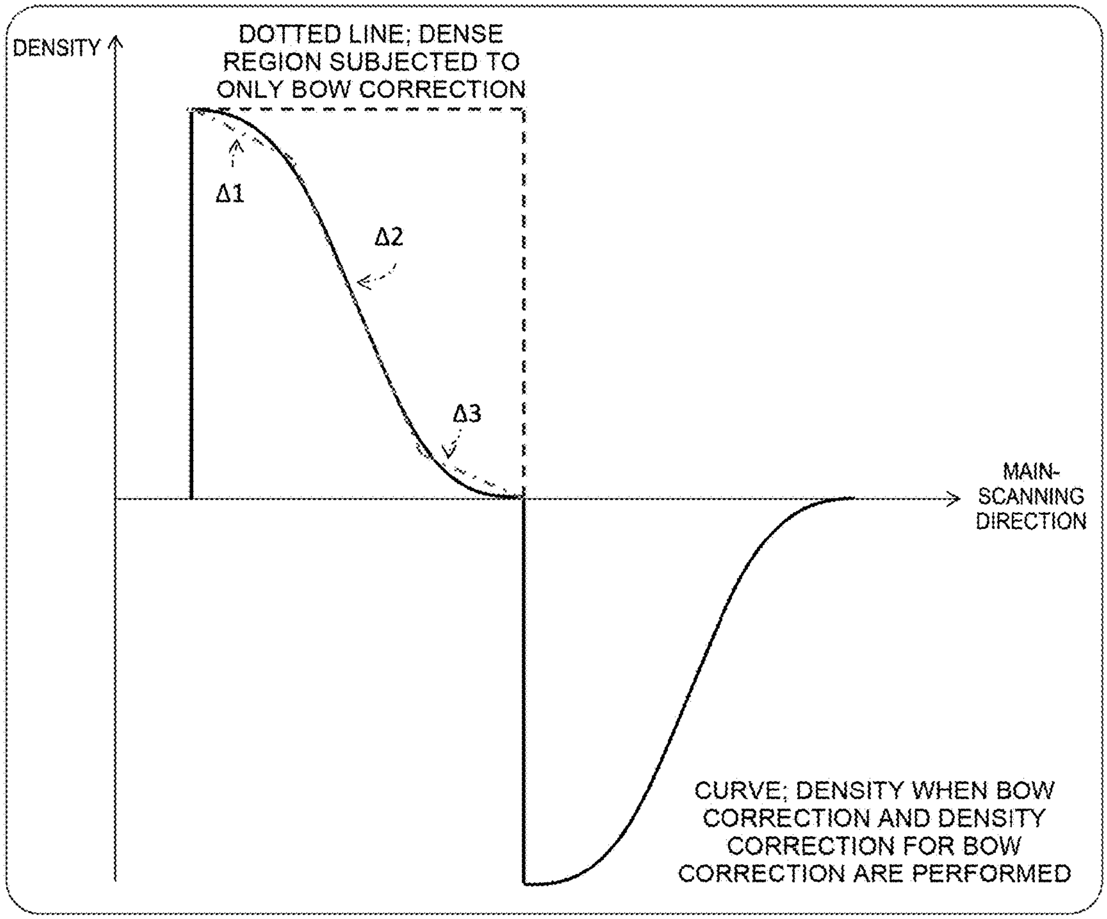
Figure 18B:
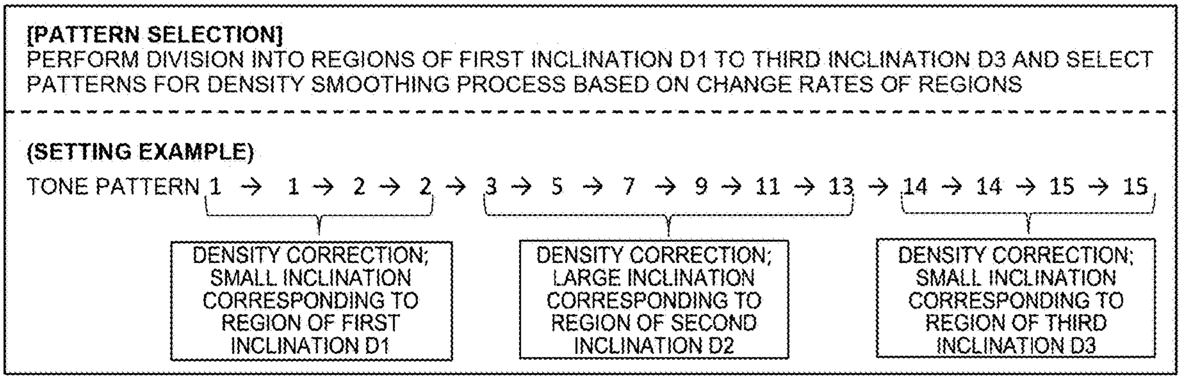

An image subjected to only the bow correction and the density correction for the bow correction is output, and patterns of the density smoothing process (TONE patterns in FIGS. 16 and 17) are set based on change rates of density of an image output signal. In this case, a pattern of the density smoothing process is switched according to a process speed of the image-forming apparatus. In FIGS. 18A and 18B, an example of a pattern setting at a first process speed is illustrated, and in FIGS. 19A and 19B, an example of a pattern setting at a second process speed (first process speed×⅔) is illustrated.

It is assumed that, when the image-forming apparatus employs the first process speed, image density distribution illustrated in FIG. 18A is obtained. A dense region in which only the bow correction is performed is denoted by a dotted line, and in this region, a density change rate (change rate of density correction value) indicated by a curve is divided into a plurality of regions, for example, three regions (region of first inclination $\Delta 1$, region of second inclination $\Delta$ 2, and region of third inclination $\Delta 3$), and patterns of the density smoothing process are selected and set for the individual regions in accordance with change rates of the individual regions.

As a selection of patterns of the density smoothing process, as illustrated in FIG. 18B, since the inclination of the density correction is small in a region of the first inclination $\Delta 1$, a density change rate is small, and TONE patterns are set in order of TONE pattern 1, TONE pattern 1, TONE pattern 2, and TONE pattern 2.

In the region of the second inclination $\Delta 2$, since the inclination of the density correction is large, the density change rate is large, and TONE patterns are set in order of TONE pattern 3, TONE pattern 5, TONE pattern 7, TONE pattern 9, TONE pattern 11, and TONE pattern 13.

In the region of the third inclination $\Delta 3$, since the inclination of the density correction is small, the density change rate is small, and TONE patterns are set in order of TONE pattern 14, TONE pattern 14, TONE pattern 15, and TONE pattern 15.

Figure 19A:
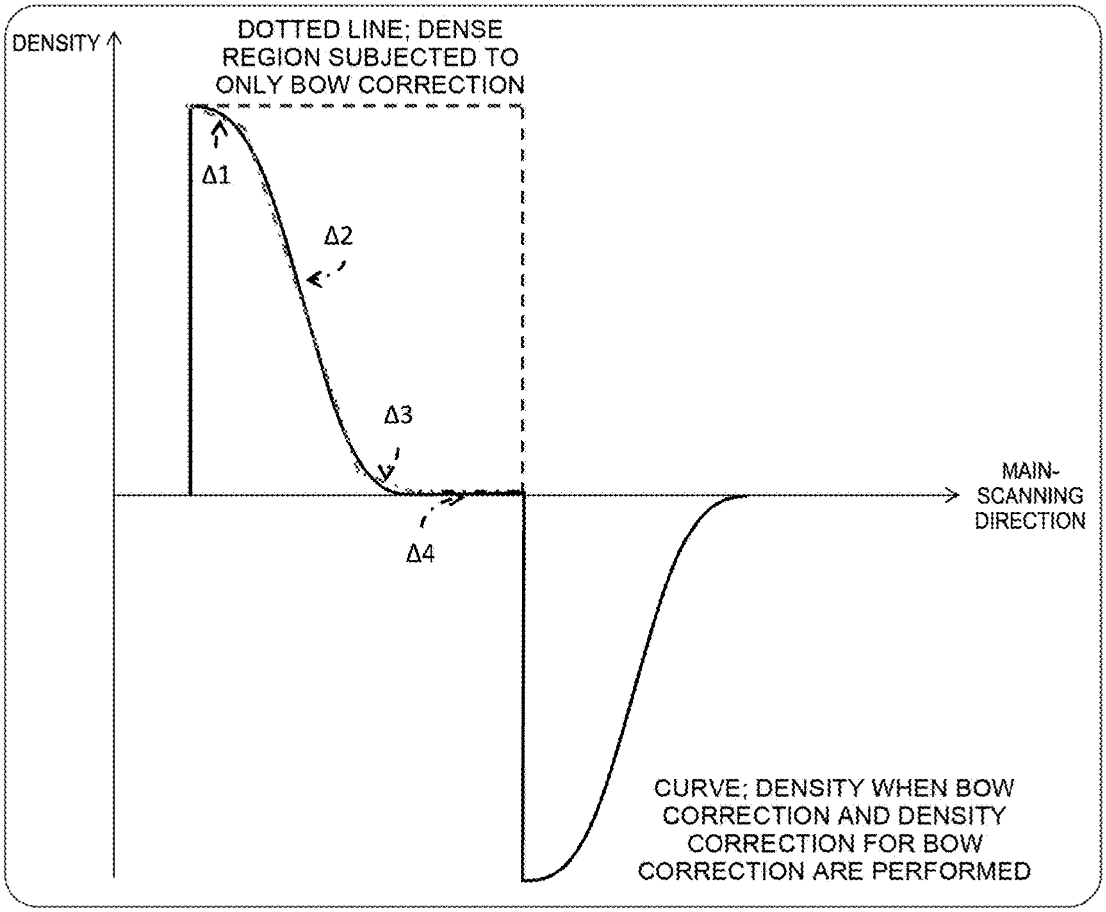

It is assumed that, when the image-forming apparatus employs the second process speed which is slower than (different from) the first process speed, image density distribution illustrated in FIG. 19A is obtained. A dense region in which only the bow correction is performed is denoted by a dotted line, and in this region, a density change rate (change rate of density correction value) indicated by a curve is divided into a plurality of regions, for example, four regions (region of first inclination Δ1, region of second inclination Δ 2, region of third inclination Δ3, and region of fourth inclination Δ4), and patterns of the density smoothing process are selected and set for the individual regions in accordance with change rates of the individual regions.

Figure 19B:
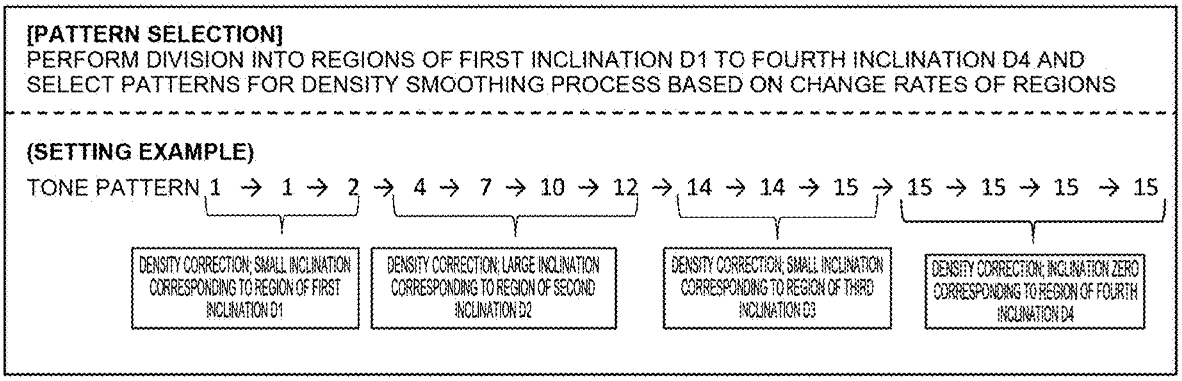

As a selection of patterns of the density smoothing process, as illustrated in FIG. 19B, since the inclination of the density correction is small in the region of the first inclination Δ1, a density change rate is small, and TONE patterns are set in order of TONE pattern 1, TONE pattern 1, and TONE pattern 2.

In the region of the second inclination Δ2, since the inclination of the density correction is large, the density change rate is large, and TONE patterns are set in order of TONE pattern 4, TONE pattern 7, TONE pattern 10, and TONE pattern 12.

In the region of the third inclination Δ3, since the inclination of the density correction is small, the density change rate is small, and TONE patterns are set in order of TONE pattern 14, TONE pattern 14, and TONE pattern 15.

In the region of the fourth inclination Δ4, since the inclination of the density correction is zero, the density change does not occur, and TONE patterns are set in order of TONE pattern 15, TONE pattern 15, TONE pattern 15, and TONE pattern 15.

2.3 Operations and Effects of Second Embodiment

First Feature Point

The image-forming apparatus according to the embodiment performs the density smoothing process in accordance with a change rate of density correction in a configuration in which density level difference is suppressed by performing the density smoothing process and the density correction so that a density level difference is not generated in a halftone image due to influence of reciprocity failure even when the electronic bow correction is performed. Therefore, density unevenness may be suppressed in a density smoothing process region.

Second Feature Point

In the configuration of the first feature point, an image slide cycle of the density smoothing process is set to a range of 1 to 15 dots in 600 dpi terms. Since switching is performed in a unit larger than 1 dot of 600 dpi, dots are less likely to be isolated, and white streaks are less likely to occur. Furthermore, since the switching is performed in a unit smaller than the 15 dots of 600 dpi, a banding phenomenon is less likely to occur, which is excellent operation effect.

Third Feature Point

With the configuration of the first feature point, a pattern of the density smoothing process is switched according to a process speed. Consequently, even when the process speed is changed, the density unevenness in the density smoothing region can be suppressed.

3. Third Embodiment 3.1 Configuration of Image-Forming Apparatus

An image-forming apparatus according to a third embodiment will be described. Note that the image-forming apparatus according to the third embodiment has a configuration similar to the image-forming apparatus according to the first embodiment and is different from the image-forming apparatus according to the first embodiment in a configuration of an optical scanning device 1200. Components having the same configurations are denoted by the same reference numerals, and description thereof will be omitted.

3.2 Optical Scanning Device 1200

Figure 20:
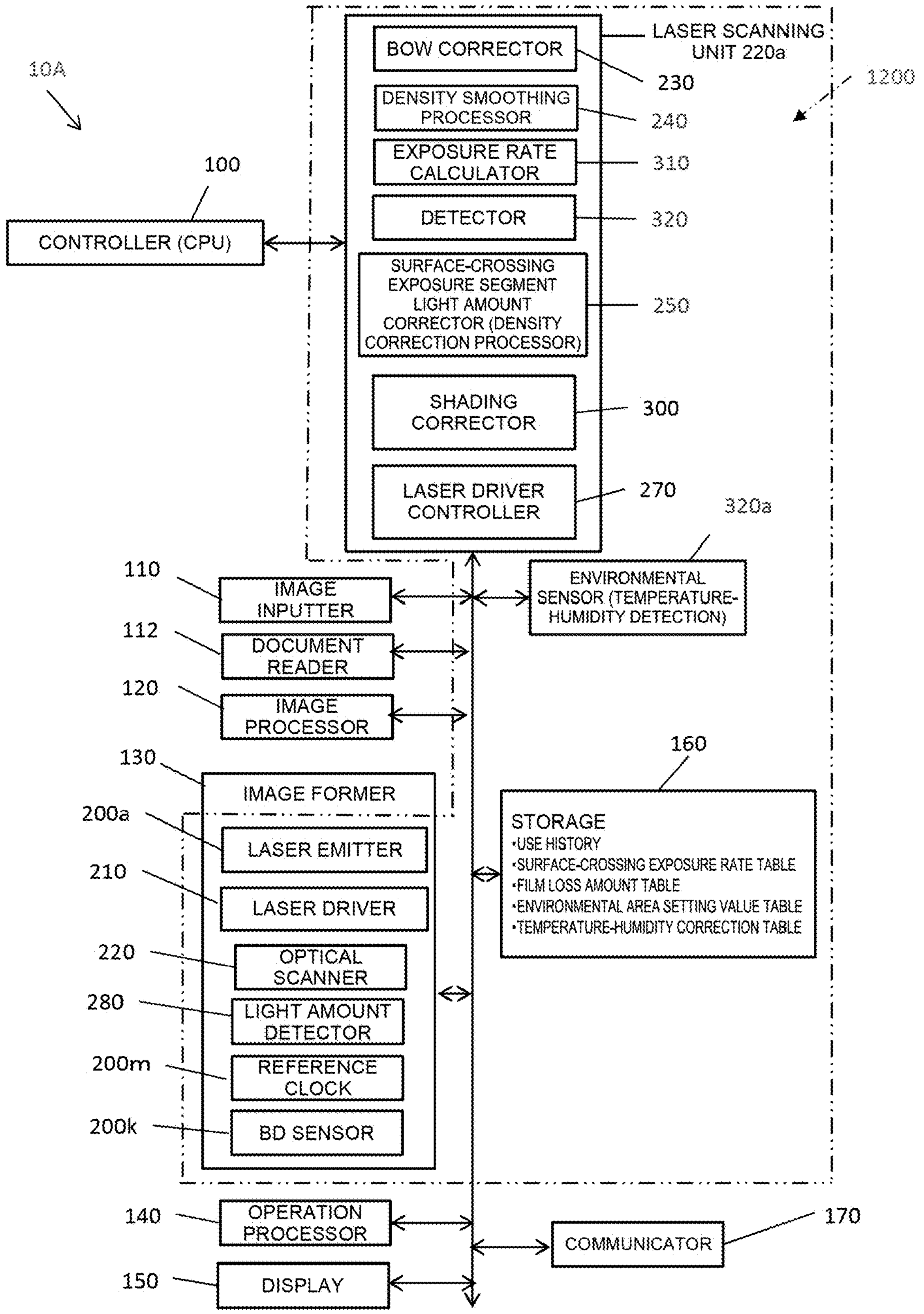
FIG. 20 is a block diagram for control of an image-forming apparatus and an optical scanning device according to a third embodiment.

As illustrated in FIG. 20, an optical scanning device 1200 is mounted on an image-forming apparatus 10A according to the third embodiment.

Figure 21:
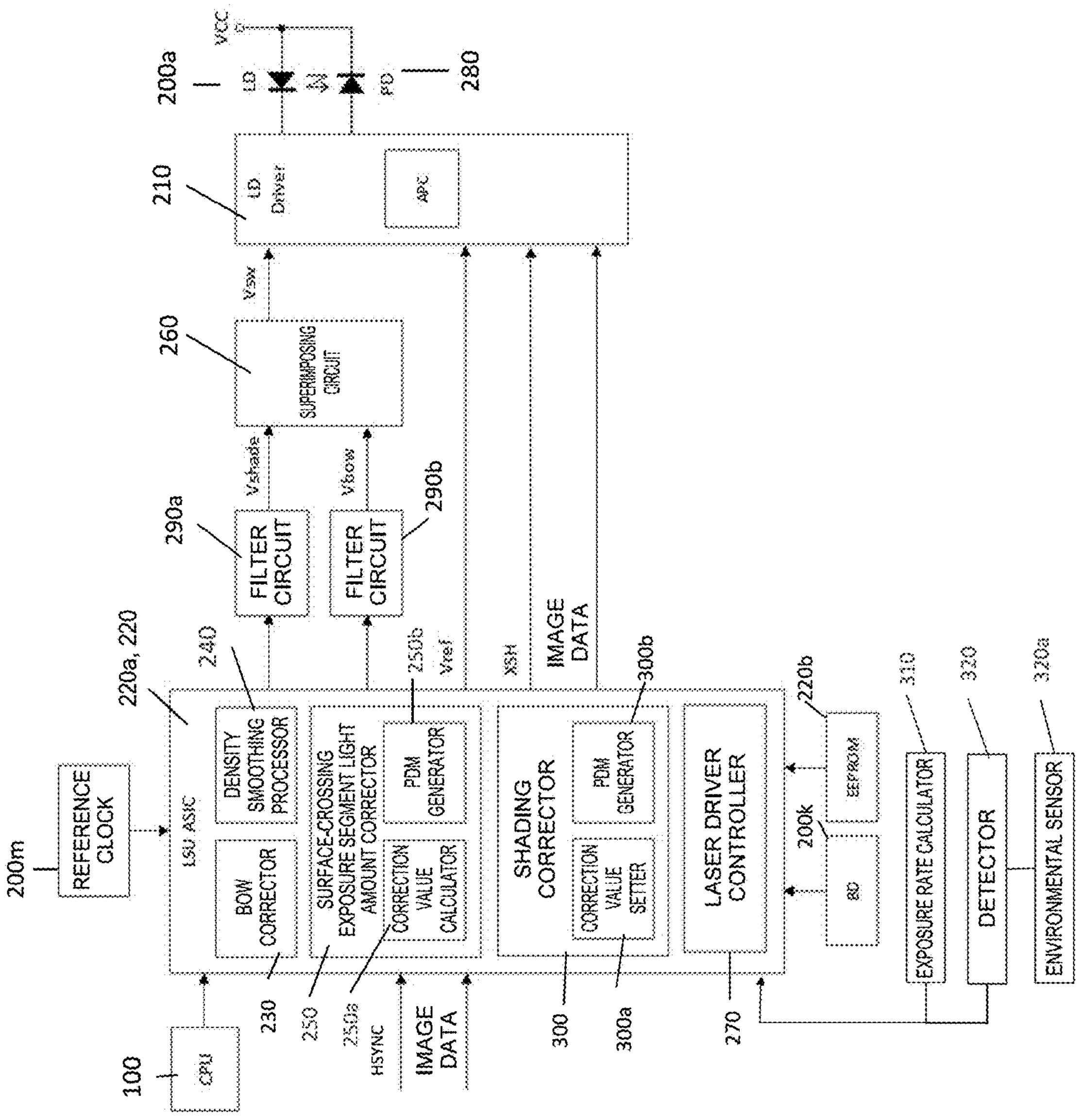
FIG. 21 is a circuit diagram illustrating a signal transmission path from a laser emitter to a laser driver of the optical scanning device according to the third embodiment.

Furthermore, FIG. 21 is an explanatory diagram illustrating a signal transmission path from a laser scanning unit 220*a* to a laser driver 210 in the optical scanning device 1200.

The optical scanning device 1200 is obtained by adding an exposure ratio calculator 310, a detector 320, and an environmental sensor 320*a* to the optical scanning device 200 (refer to FIGS. 2 and 3) described in the first embodiment. As will be described later, the storage 160 stores a use history, a surface-crossing exposure ratio table, a film loss amount table, an environmental area setting table, and a temperature-humidity correction table.

As illustrated in FIGS. 20 and 21, the optical scanning device 1200 includes a laser emitter 200*a* that includes a plurality of laser emitting elements (semiconductor laser devices (LDs) and emits a plurality of laser beams (corresponding to "multi-beams") which are arranged in a sub-scanning direction of a photoconductor drum (not illustrated), a laser driver 210 that controls the laser emitter 200*a*, an optical scanner 220 that scans the photoconductor drum (not illustrated) with the multi-beams emitted from the laser emitter 200*a* based on image data, a bow corrector 230 that electronically performs bow correction on image data, a density smoothing processor 240 that smooths a density level difference in an image subjected to the bow correction by performing a density smoothing process, a surface-crossing exposure segment light amount corrector (density correction processor) 250 that corrects a density level of the image subjected to the bow correction by correcting a light amount of the surface-crossing exposure segment, a shading corrector 300 that performs a shading correction process on the image, a laser driver controller 270 that controls light emission of the plurality of light emitting elements disposed on the laser emitter (LD) 200*a* based on the image data subjected to the bow correction and the density smoothing process and the control signal subjected to the density correction, a detector (data acquirer) 320 that acquires temperature-humidity data in the device and the number of rotations of the photoreceptor drum (image carrier), and at least one controller 100 that changes a light amount correction amount of the surface-crossing exposure segment in accordance with the acquired temperature-humidity data and the acquired number of rotations of the image carrier.

Note that the optical scanning device 1200 includes a surface-crossing exposure ratio calculator 310 that divides data into a plurality of blocks in a main scanning direction of the data, and calculates, for each block, a rate of the surface-crossing exposure in which the reciprocity failure occurs in one scanning operation.

The laser emitter 200*a* includes a plurality of laser emitting elements, and a light amount detector 280 including a photodiode (PD) detects an amount of light emitted from the laser emitting elements.

A reference clock signal generator 200*m* generates a reference clock signal for control. Abeam detection (BD) sensor 200*k* is disposed on a starting end side of a scanning area of a light beam and controls a timing when an electrostatic latent image is written on the photoconductor drum. Note that, in FIG. 21, Vcc denotes a power supply voltage.

In the third embodiment, the detector 320 is configured such that an environmental sensor 320*a* for detecting temperature-humidity data inside the image-forming apparatus is installed inside the image-forming apparatus, and the detector 320 acquires the temperature-humidity data based on a signal output from the environmental sensor 320*a*.

In addition, a film loss amount of the photoconductor drum is acquired by the detector 320 based on data of use history of the photoconductor drum stored in the storage 160, for example, history of the number of rotations after the photoconductor drum is installed in the device.

The surface-crossing exposure segment light amount corrector 250 calculates a correction amount using a correction coefficient corresponding to the surface-crossing exposure ratio, a correction coefficient corresponding to temperature and humidity, a correction coefficient corresponding to the number of drum rotations, and a correction coefficient corresponding to the light emission rate of printing. The surface-crossing exposure segment light amount corrector 250 obtains a correction coefficient to be used by itself using a correction coefficient table stored in a corresponding storage region in the storage 160. The correction coefficient table may be stored in a storage 220*b*, such as an EEPROM, of the laser scanning unit 220*a*, in addition to the storage 160.

That is, as storage regions of the storage 160, a storage region for storing a table of correction coefficients corresponding to the surface-crossing exposure ratios, a storage region for storing a table of correction coefficients corresponding to film loss amounts of the drum, a storage region for storing a table of setting values of an environmental area corresponding to the temperature-humidity data in the image-forming apparatus, and a storage region for storing a table of correction coefficients of temperature and humidity obtained from the setting values of the environmental area are generated and set. The surface-crossing exposure segment light amount corrector 250 obtains a correction light amount using the individual correction coefficients obtained from the individual tables, and the laser driver controller 270 corrects a light amount of an image signal input to the laser driver 210 in accordance with the correction light amount.

As illustrated in FIG. 21, the bow corrector 230, the density smoothing processor 240, the exposure ratio calculator 310, the detector 320, the surface-crossing exposure segment light amount corrector 250, the shading corrector 300, and the laser driver controller 270 are realized when the laser scanning unit 220*a* (LSU) having an electronic control configuration mounted on the optical scanning device 1200 is controlled based on an instruction signal of the at least one controller 100. Details of the individual sections will be described later.

As illustrated in FIG. 21, in the optical scanning device 1200, the laser scanning unit (LSU) 220*a* of the optical scanner 220 is controlled by the at least one controller 100. A reference clock (200*m*) and a BD signal (200*k*) are input to the laser scanning unit 220*a*. In the laser scanning unit 220*a*, the density smoothing processor 240 performs the density smoothing process on an image subjected to electronic bow correction in accordance with a control signal supplied from the at least one controller 100, and the shading corrector 300 generates a shading density correction signal (Vshade) for shading correction and inputs a signal, such as a bow correction signal (Vbow) for electronic bow correction, to the laser driver 210. The laser driver controller 270 controls the laser driver 210 so as to control a multi-beam light emitting operation of the laser emitter 200*a* based on the input signal. Note that, in FIG. 21, Vref is a reference voltage in the sub-scanning direction.

The laser scanning unit 220*a* is configured as an application-specific integrated circuit (LSU ASIC). The integrated circuit (LSU ASIC) of the laser scanning unit 220*a* receives a control signal supplied from the at least one controller 100, image data, a horizontal synchronization signal HSYNC, a reference clock signal supplied from the reference clock signal generator 200*m*, a detection signal supplied from the beam detection (BD) sensor 200*k*, and the like.

3.3 Specific Control Example

Next, concrete control examples will be described as first to third examples.

3.3.1 Control in First Example

In the first example, the laser light amount is corrected based on the exposure ratio obtained when the reciprocity failure occurs, a state of the laser emitter (laser emitting element LD), and the like.

Figure 22:
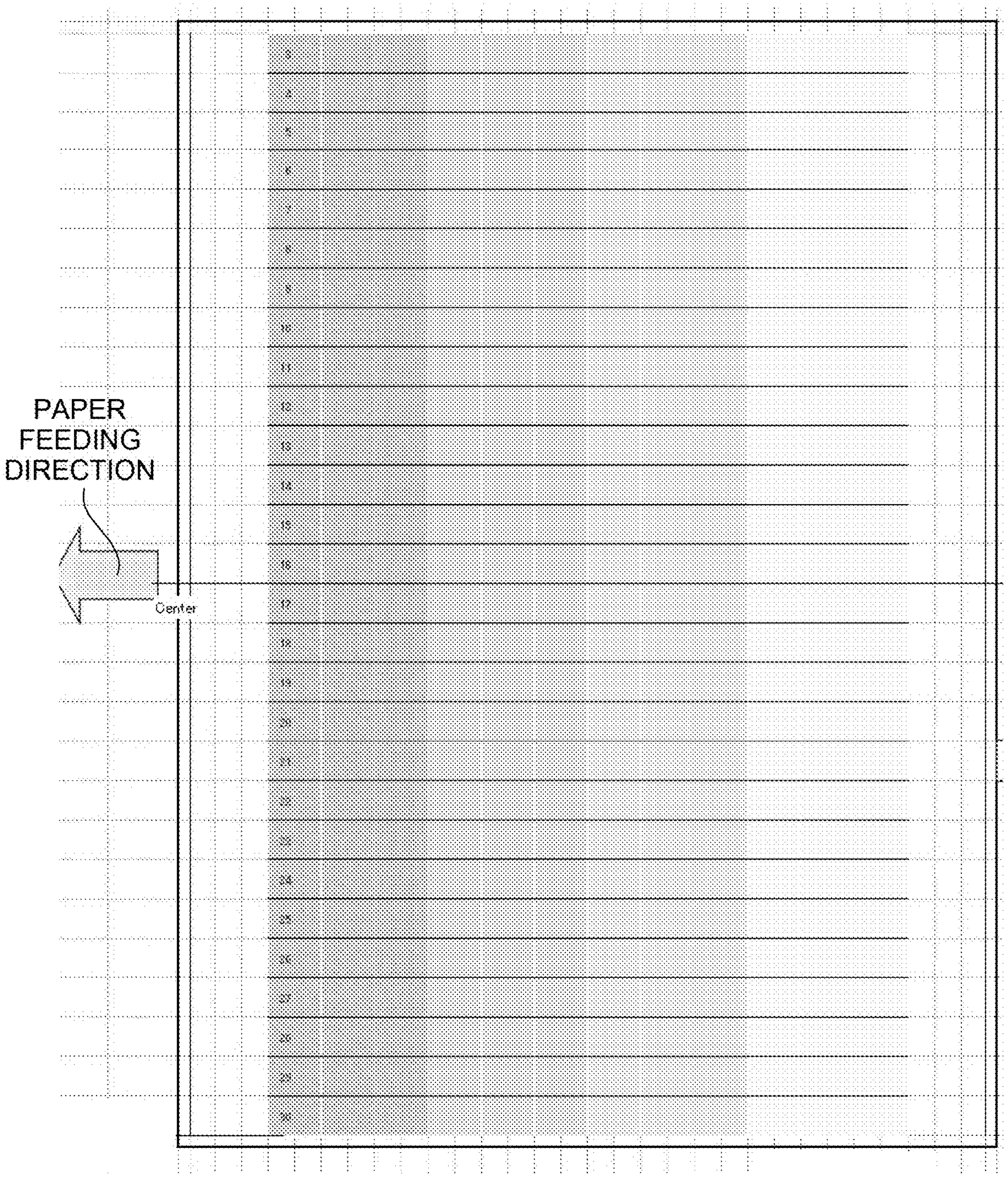
FIG. 22 is an image diagram of an image region divided into a plurality of blocks.
Figures 23, 24:
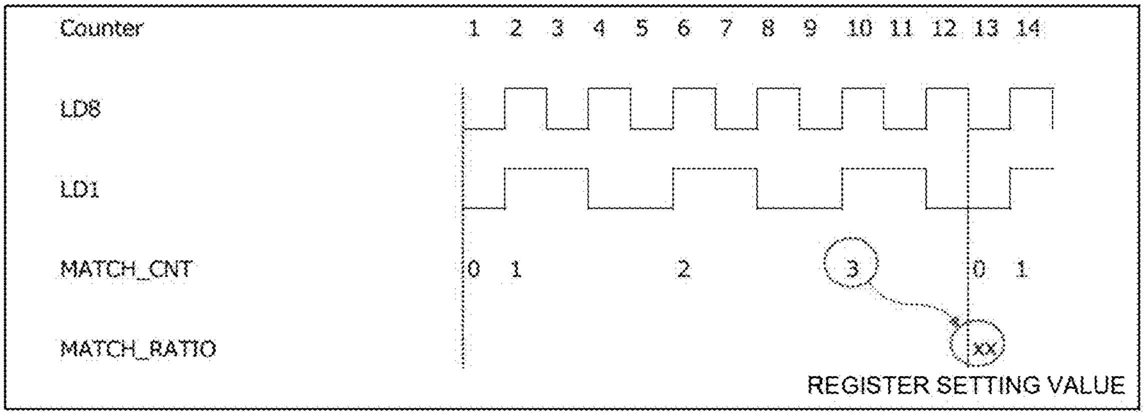
FIG. 23 is an explanatory view of a method for calculating a surface-crossing exposure ratio in an image region according to a first example.
FIG. 24 is an explanatory view of an example of a table of a film loss amount of a drum and a correction coefficient Cx corresponding the film loss amount.

FIG. 22 is an image of an image region divided into a plurality of blocks, FIG. 23 is an explanatory diagram of a calculation method of the surface-crossing exposure ratio in the image region, FIG. 24 is an example of a table of a film loss amount of the drum and a correction coefficient Cx corresponding the film loss amount, and FIG. 25 is an example of a table of a correction coefficient ev with respect to temperature and humidity in the image-forming apparatus.

Feature points of the first example are as follows.

[a] The surface-crossing exposure ratio in an end LD in the image region generated by the electronic bow correction in the image region is calculated.

[b] The light amount correction is performed to reduce the light amount in the image region as the exposure ratio in the end LD increases.

[c] A film loss amount of the photoconductor drum is calculated (from the number of rotations obtained after the photoconductor drum is installed).

[d] The temperature and humidity in the device are calculated.

[e] The correction amount of [b] is calculated based on results of the calculations of [a], [c], and [d].

As illustrated in FIG. 20, when the electronic bow correction is performed in the image-forming apparatus 10A, as described above in the sections of "1.5.1 Electronic Bow Correction" to "1.5.4 Grayscale Image" and FIGS. 5 to 8, the electronic bow correction causes the reciprocity failure due to the surface-crossing exposure by the laser emitting elements LD at the end portions in the image region.

In the first example, as shown in FIGS. 20 and 21, the laser scanning unit 220*a* (LSU) realizes such a countermeasure against the reciprocity failure caused by the surface-crossing exposure under control based on an instruction issued by the at least one controller 100.

Specifically, the image data is divided into a plurality of blocks in the main scanning direction, a surface-crossing exposure ratio which is a ratio in which surface-crossing exposure that causes the reciprocity failure by one scanning operation is included is calculated for each block (exposure ratio calculator 310), temperature and humidity data in the device and a film loss amount of the photoconductor drum are acquired (detector 320), and a light amount of the multi-beams in the block is corrected in accordance with the calculated surface-crossing exposure ratio, the acquired temperature and humidity data, and the film loss amount of the photoconductor drum (surface-crossing exposure segment light amount corrector 250).

1 Calculation of Surface-Crossing Exposure Ratio (Exposure Ratio Calculator 310)

The exposure ratio calculator 310 obtains a count of the reciprocity failure that occurs in the surface-crossing exposure by a beam light emitted from an end light emitting element in the plurality of light emitting elements in a segment of the laser emitter (light source unit) 200*a*.

In the exposure ratio calculator 310, as the count of the reciprocity failure, a count of surface-crossing exposure is obtained based on the number of timings at which a light emission timing of one light emitting element overlaps a light emission timing of the other light emitting element among the end portion light emitting elements that perform the surface-crossing exposure, and the surface-crossing exposure ratio is calculated based on the count. A specific method for obtaining the surface-crossing exposure ratio will be described with reference to FIGS. 22 and 23.

FIG. 22 is a diagram illustrating an image of the image region according to the first example. In FIG. 22, an image of an image region is divided into a plurality of blocks in the main scanning direction which is perpendicular to a conveyance direction (for example, the image region corresponding to the Δ4 size is divided into 1 to 30 blocks).

FIG. 23 is a diagram schematically illustrating a calculation of the surface-crossing exposure ratio in the image region.

In FIG. 23, light is emitted when waveforms of light emission signals of the laser light emitting element LD8 and the laser light emitting element LD1 rise (when rising portions are synchronized).

Since the surface-crossing exposure occurs when both the waveforms rise upward (when both of the laser light emitting elements LD8 and LD1 emit light in an ON state), the exposure ratio calculator 310 counts the number of simultaneous light emissions in which both the signal waveforms rise upward, and the count number (MATCH_CNT) serves as the number of surface-crossing exposures. Then, based on the number of simultaneous light emissions with respect to the total count number (Counter), the surface-crossing exposure ratio (MATCH_RATIO) at which the surface-crossing exposure occurs can be calculated.

In the example of FIG. 23, since the number of simultaneous light emissions is 3, the surface-crossing exposure ratio is 0.25 (25%) as follows: MATCH_RATIO=3/12=1/4.

2 Calculation of Correction Light Amount

A correction light amount (Ldebc_N) corresponding to the surface-crossing correction coefficient, the temperature-humidity data (environmental data) in the device, and the film loss amount of the photoconductor drum is calculated from the following expression (2).

$$Ldebc\_N = ev \times Cx \times r\_N \quad (2)$$

Here, ev indicates a correction coefficient corresponding to temperature and humidity, Cx indicates a correction coefficient corresponding to the film loss amount of the photoconductor drum, and r_N denotes a correction coefficient corresponding to the surface-crossing exposure ratio of printing.

These correction coefficients can be calculated using, for example, tables illustrated in FIGS. 24 to 25.

FIG. 24 is a table of the film loss amount (film loss correction count) of the drum and a correction value (example of the correction coefficient Cx) corresponding thereto. Note that the film loss correction count corresponds to the number of rotations after the photoconductor drum is installed in the image-forming apparatus (which is the same as the process correction specification), and can be acquired from the use history of the image-forming apparatus. The correction coefficient Cx (e.g., 1.0 to 2.0) is calculated from history of the number of rotations using, for example, the table of FIG. 24.

FIG. 25 is a diagram illustrating an example of a table of the correction coefficient ev with respect to an environmental correction coefficient, that is, temperature and humidity in the image-forming apparatus. An environmental sensor (temperature-humidity sensor) 320*a* (refer to FIGS. 20 and 21) is provided in the image-forming apparatus, and the detector 320 acquires temperature-humidity data detected by the environmental sensor 320*a* and inputs the data to the surface-crossing exposure segment light amount corrector 250.

As illustrated in FIG. 25, an environmental area according to the temperature and humidity is divided into environmental areas 1 to 10, and the correction coefficients ev (for example, 0.6 to 1.5) corresponding to the environmental areas are calculated.

FIG. 26 is a diagram illustrating an example of a table (environmental area determination table dedicated to multi-bias correction) for setting environmental areas with respect to temperature and humidity.

In FIG. 26, humidity (%) is set on a vertical axis and temperature (° C.) is set on the horizontal axis, and the environmental areas (1 to 10) corresponding to detected values of temperature and humidity in the image-forming apparatus are determined based on this table.

FIG. 27 is a diagram illustrating an example of a table of the correction coefficient r_N corresponding to the surface-crossing exposure ratio.

The correction coefficient r_N is obtained from the surface-crossing exposure ratio illustrated in the example of FIG. 15 described above using the table of FIG. 27.

The correction light amount (Ldebc_N) is calculated in accordance with Expression (2) using the correction coefficient ev corresponding to the temperature-humidity, the correction coefficient Cx corresponding to the film loss amount of the photoconductor drum, and the correction coefficient r_N corresponding to the surface-crossing exposure ratio which are obtained from the respective table examples illustrated in FIGS. 24 to 27. The light emission amount of the laser emitter 200*a* is corrected using the calculated correction light amount (Ldebc_N).

According to the first example, since the individual correction coefficients are obtained from the corresponding tables, a correction amount is not required to be calculated. Therefore, the problem of the density unevenness may be solved with a relatively small calculation amount, which is an operation effect.

Note that, in the light amount correction, it is preferable to correct a light amount of at least one of the end light emitting elements (LD8 and LD1 in the case of eight LDs in the segment) in the segment of the laser light emitter, and to reduce the light amount as the surface-crossing exposure ratio in the segment increases. When the light amount correction control of both the end light emitting elements is selected, the density is easily changed, and when one of them is controlled, signal processing can be simplified.

3.3.2 Control in Second Example

In the second example, correction is performed by changing the correction coefficient corresponding to the film loss amount of the photoconductor drum calculated by the same technique as in the first example and the environmental correction coefficient (temperature-humidity coefficient) in accordance with density (pixel density). Specifically, in the light amount correction, a correction amount is calculated using a correction coefficient corresponding to temperature and humidity, a correction coefficient corresponding to the number of drum rotations, and a correction coefficient corresponding to the light emission ratio of printing.

Figures 29, 30:
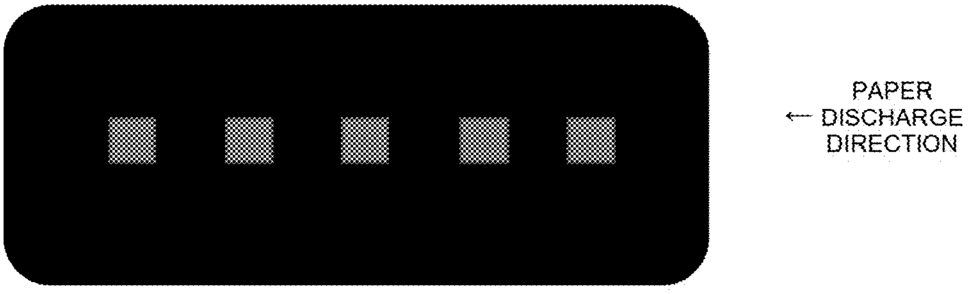
FIG. 29 is an explanatory view of an example of a table of an environmental area corresponding to temperature and humidity and a correction coefficient ev corresponding to an image average density level.
FIG. 30 is an explanatory view of an example of an image in which a patch is printed on a transfer member according to a third example.

FIG. 28 is a diagram illustrating an example of a table of the correction coefficient Cx corresponding to the film loss amount of the drum and the image average density, and FIG. 29 is a diagram illustrating an example of a table of the correction coefficient ev corresponding to the environmental area corresponding to the temperature and humidity and the image average density.

Feature points of the second example are as follows.

[a] The surface-crossing exposure ratio in an end LD in the image region generated by the electronic bow correction in the image region is calculated.

[b] The light amount correction is performed to reduce the light amount in the image region as the exposure ratio in the end LD increases.

[c] A film loss amount of the photoconductor drum is calculated (from the number of rotations obtained after the photoconductor drum is installed).

[d] The temperature and humidity in the device are calculated.

[e] The print density in the region is calculated.

[f] The correction amount of [b] is calculated based on results of the calculations of [a], [c], [d] and [e].

Note that the feature points [a], [c], [d], and [e] are the same as those in the first example.

In the second example, in the calculation of the printing density in the region of the item [f], average densities of images in individual regions are digitally calculated before printing in the image data divided into the blocks (divided into the regions) as illustrated in FIG. 22.

Furthermore, in Expression (2), the correction coefficient Cx corresponding to the film loss amount is calculated in accordance with the correction count corresponding to the film loss and the image average density, for example, as in the table illustrated in FIG. 28.

The correction coefficient ev corresponding to the temperature and humidity in the device is calculated in accordance with the environmental area corresponding to the density and humidity and the image average density as in the table illustrated in FIG. 29.

In the second example, since the correction coefficient is calculated in accordance with the image average density, the correction can be performed even when a toner adhesion amount is increased, the film thickness is reduced, and the environmental correction is extremely changed.

3.3.3 Control in Third Example

In the third example, printing is performed on a transfer member (intermediate transfer member) by converting the light amount, the density of the printed image is read by an image sensor, and the light amount is corrected based on the read density.

Feature points of the third example are as follows.

[i] The table of the first example or the second example is provided.

[j] At a timing of registration adjustment or the like, patches of "absence of surface-crossing exposure ratio" and several types of patch of "presence surface-crossing exposure ratio" are printed on one straight line on the transfer member.

[k] The patch of "presence of surface-crossing exposure ratio" is printed in the case of correction using the table of [i] and in the case of further change in a light amount.

The patch is read by an imaging sensor (not illustrated), such as a charge-coupled device (CCD) camera.

[m] An appropriate correction value is calculated from the print density change in [k] described above.

[n] A difference between the table of [i] and a calculation result of [m] is stored.

[o] At a time of actual operation, the table of [i] and the difference of [n] are operated together.

FIG. 30 is a diagram illustrating an example of printing of the patch of the item [k]. The patch is printed on a transfer member of the image-forming apparatus having an intermediate transfer member. The imaging sensor is installed at an appropriate position facing the transfer member.

Figures 31, 32:
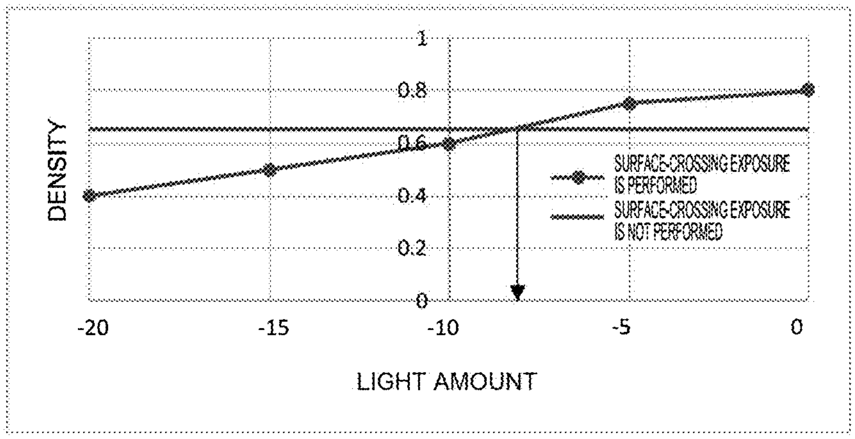
FIG. 31 is an explanatory view of an example of a calculation of a correction amount.
FIG. 32 is an explanatory view of a differential correction amount with respect to a surface-crossing exposure ratio.

FIG. 31 shows a change in print density with respect to a change in light amount of the read patch, and a correction value of the item [m] is calculated in accordance with the change in density. For this correction amount, an appropriate correction amount is calculated such that the change in printing density of "presence of surface-crossing exposure" is the same as that of "absence of surface-crossing exposure".

A difference between the obtained correction amount (correction coefficient) and the correction coefficient r_N illustrated in FIG. 27 is calculated and stored in the memory (storage 160). A reference of the difference is the correction light amount (Ldebc_N) obtained with reference to FIGS. 27 to 29 at a print timing.

Note that, since the patches of the case [j] without the surface-crossing exposure segment and the case [k] with the surface-crossing exposure segment are printed, the printed patches are read by the density sensor [l], and the correction value is changed [m] to [o] from the change of individual read patch densities, the density correction can be accurately performed in accordance with a printing situation which is different according to a condition, such as an environment.

FIG. 32 is an example of a correction value difference table.

An actual operation is performed also with reference to the table of FIG. 27.

The third example can cope with a variation occurring in each apparatus. Since the difference is stored, the storage region can be reduced, which is an operation effect.

Note that, according to the embodiment, the light amount is corrected by using the correction coefficient corresponding to the temperature and humidity and the correction coefficient corresponding to the film loss amount of the drum as the environmental data, but the present disclosure is not limited thereto. In the light amount correction, at least one of the correction coefficient corresponding to the temperature and humidity and the correction coefficient corresponding to the film loss amount of the drum can be adjusted based on image data. Accordingly, only a required portion may be adjusted, and a control load is reduced.

Furthermore, the light amount correction can be performed by obtaining pixel density based on image data, specifying a region having a pixel density equal to or higher than a threshold value, and adjusting an exposure amount of a block corresponding to the specified region. Accordingly, density unevenness is specified and a light amount of only a block may be corrected, so that a calculation and a control load are reduced.

Although the embodiments have been described, specific configurations are not limited to the configurations of the embodiments, and designs or the like to the extent that they do not depart from the gist of the present disclosure are also included in the scope of the claims.

Furthermore, the program that operates in each device in the embodiments is a program that controls a CPU or the like (a program that causes a computer to function) in a manner to realize the functions of the above embodiments. Moreover, information handled by these devices is temporarily stored in a temporary storage device (for example, a RAM) when being processed, and then stored in various storage devices, such as a ROM and an HDD, where the information is read, corrected, and written by the CPU as needed.

Here, a recording medium for storing the program may be any non-transitory recording medium, such as a semiconductor medium (for example, a ROM or a nonvolatile memory card), an optical recording medium, such as an optical recording medium or a magneto-optical recording medium (for example, a digital versatile disc (DVD), a magneto optical disc (MO), a mini disc (MD), a compact disc (CD), or a Blu-ray (registered trademark) disc), or a magnetic recording medium (for example, a magnetic tape or a flexible disk).

Furthermore, the functions of the present disclosure may also be realized not only by executing the loaded programs but also processing in cooperation with the operating system, other application programs, or the like in accordance with the instructions of the programs.

Furthermore, in the case of distribution of the program to the market, the program can be stored and distributed in a portable storage device, or transferred to a server computer connected via a network, such as the Internet. In this case, a storage device of the server computer is also included in the present disclosure as a matter of course.

In addition, some or all of the devices in the above-described embodiments may be realized as an LSI (Large Scale Integration), which is typically an integrated circuit. Respective functional blocks of the apparatuses may be individually formed as a chip, or may be partially or wholly integrated and formed as a chip. Furthermore, a method of achieving the integrated circuit is not limited to the LSI, but may be realized by a dedicated circuit or by a general-purpose processor. In addition, when a technology for achieving the integrated circuit which substitutes for the LSI emerges as a result of the progress of the semiconductor technology, it is of course possible to use an integrated circuit based on such a technology.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An image-forming apparatus employing an electrophotographic method that scans a surface of an image carrier with multi-beams emitted from a plurality of light emitting elements based on image data, the image-forming apparatus comprising:

a bow corrector that performs an electronic bow correction on the image data;

a density smoothing processor that performs a density smoothing process to smooth a density level difference of an image subjected to the electronic bow correction;

a density correction processor that performs a density correction on the image subjected to the electronic bow correction using a light amount correction of a surface-crossing exposure segment; and a light emitting element driver controller that controls light emission of a plurality of light emitting elements of a light beam emitter based on the image data subjected to the density smoothing process and a control signal subjected to the density correction, wherein a density correction amount is changed in accordance with an adjustment pitch of an end-side light emitting element affected by a reciprocity failure.

2. The image-forming apparatus according to claim 1, wherein the light amount correction of the surface-crossing exposure segment is a light amount correction of a pulse density modulation (PDM) method.

3. The image-forming apparatus according to claim 1, wherein the density correction processor sets a number of segments for the density correction to be larger than a number of segments for the density smoothing process.

4. The image-forming apparatus according to claim 1, wherein the light amount correction of the surface-crossing exposure segment is performed on at least one of end-side light emitting elements.

5. The image-forming apparatus according to claim 1, further comprising at least one controller that controls the density smoothing processor in accordance with a change rate of the density correction of the density correction processor to smooth the density level difference of the image.

6. The image-forming apparatus according to claim 5, wherein the density smoothing process sets an image slide cycle to a range of 1 dot to 15 dots in terms of 600 dpi.

7. The image-forming apparatus according to claim 5, wherein a pattern of the density smoothing process is switched in accordance with a process speed of image formation.

8. The image-forming apparatus according to claim 1, further comprising:

a detector that acquires temperature and humidity data in the image-forming apparatus and a number of rotations of the image carrier; and at least one controller that changes a light amount correction amount of the surface-crossing exposure segment in accordance with the acquired temperature and humidity data and the acquired number of rotations of the image carrier.

9. The image-forming apparatus according to claim 8, wherein the at least one controller corrects a light amount of at least one of end-side light emitting elements in the segment, and reduces the light amount as a surface-crossing exposure ratio in the segment is higher.

10. The image-forming apparatus according to claim 8, wherein, in the light amount correction of the at least one controller, a correction amount is calculated using a correction coefficient corresponding to the temperature and humidity data, a correction coefficient corresponding to the number of rotations of the image carrier, and a correction coefficient corresponding to a light emission ratio of printing.

11. The image-forming apparatus according to claim 8, wherein the at least one controller adjusts at least one of a correction coefficient corresponding to the temperature and humidity data and a correction coefficient corresponding to the number of rotations of the image carrier based on the image data.

12. The image-forming apparatus according to claim 8, wherein the at least one controller obtains a pixel density based on the image data, specifies a region having a pixel density equal to or higher than a threshold value, and corrects a light amount of a block corresponding to the specified region.

13. The image-forming apparatus according to claim 1, wherein a patch indicating absence of the surface-crossing exposure segment and a patch indicating presence of a plurality of types of the surface-crossing exposure segment are printed, the printed patches are read by a density sensor, and at least one controller changes a correction value in accordance with a density change of the read patches.

14. A method for controlling an image-forming apparatus employing an electrophotographic method that scans a surface of an image carrier with light beams emitted from a plurality of light emitting elements based on image data, the method comprising:

performing an electronic bow correction on the image data;

performing a density smoothing process to smooth a density level difference of an image subjected to the electronic bow correction;

performing a density correction on the image subjected to the electronic bow correction using a light amount correction of a surface-crossing exposure segment; and controlling light emission of a plurality of light emitting elements of a light beam emitter based on the image data subjected to the density smoothing process and a control signal subjected to the density correction, wherein a density correction amount is changed in accordance with an adjustment pitch of an end-side light emitting element affected by a reciprocity failure.

15. An image-forming apparatus employing an electrophotographic method that scans a surface of an image carrier with multi-beams emitted from a plurality of light emitting elements based on image data, the image-forming apparatus comprising:

a bow corrector that performs an electronic bow correction on the image data;

a density smoothing processor that performs a density smoothing process to smooth a density level difference of an image subjected to the electronic bow correction;

a density correction processor that performs a density correction on the image subjected to the electronic bow correction using a light amount correction of a surface-crossing exposure segment;

a light emitting element driver controller that controls light emission of a plurality of light emitting elements of a light beam emitter based on the image data subjected to the density smoothing process and a control signal subjected to the density correction; and at least one controller that controls the density smoothing processor in accordance with a change rate of the density correction of the density correction processor to smooth the density level difference of the image.

16. An image-forming apparatus employing an electrophotographic method that scans a surface of an image carrier with multi-beams emitted from a plurality of light emitting elements based on image data, the image-forming apparatus comprising:

a bow corrector that performs an electronic bow correction on the image data;

a density smoothing processor that performs a density smoothing process to smooth a density level difference of an image subjected to the electronic bow correction;

a density correction processor that performs a density correction on the image subjected to the electronic bow correction using a light amount correction of a surface-crossing exposure segment;

a light emitting element driver controller that controls light emission of a plurality of light emitting elements of a light beam emitter based on the image data subjected to the density smoothing process and a control signal subjected to the density correction;

a detector that acquires temperature and humidity data in the image-forming apparatus and a number of rotations of the image carrier; and at least one controller that changes a light amount correction amount of the surface-crossing exposure segment in accordance with the acquired temperature and humidity data and the acquired number of rotations of the image carrier.

* * * * *